US012609011B2

(12) United States Patent
Lal et al.

(10) Patent No.: US 12,609,011 B2
(45) Date of Patent: Apr. 21, 2026

(54) SYSTEMS AND METHODS FOR PACKAGE MONITORING

(71) Applicant: Adeia Guides Inc., San Jose, CA (US)

(72) Inventors: Dhananjay Lal, Englewood, CO (US); Reda Harb, Saint Petersburg, FL (US); Jean-Yves Couleaud, Mission Viejo, CA (US)

(73) Assignee: ADEIA GUIDES INC., San Jose, CA (US)

( * ) Notice: Subject to any disclaimer, the term of this patent is extended or adjusted under 35 U.S.C. 154(b) by 0 days.

(21) Appl. No.: 18/888,971

(22) Filed: Sep. 18, 2024

(65) Prior Publication Data

US 2026/0080763 A1     Mar. 19, 2026

(51) Int. Cl.
| | |
|---|---|
| *G08B 13/196* | (2006.01) |
| *G06Q 10/0833* | (2023.01) |
| *G06V 20/52* | (2022.01) |
| *G06V 40/16* | (2022.01) |
| *G06V 40/20* | (2022.01) |

(52) U.S. Cl.
CPC ..... *G08B 13/1961* (2013.01); *G06Q 10/0833* (2013.01); *G06V 20/52* (2022.01); *G06V 40/172* (2022.01); *G06V 40/20* (2022.01)

(58) Field of Classification Search
CPC .. G06Q 10/0833; G06V 40/20; G06V 40/172; G06V 20/52; G08B 13/1961
See application file for complete search history.

(56) References Cited

U.S. PATENT DOCUMENTS

| | | | |
|---|---|---|---|
| 11,615,370 B1 | 3/2023 | Li et al. | |
| 11,699,287 B1 * | 7/2023 | Wang .................. | G06Q 10/083 |

(Continued)

FOREIGN PATENT DOCUMENTS

| | | |
|---|---|---|
| CN | 110082846 A | 8/2019 |
| JP | 2015-184894 A | 10/2015 |
| WO | 2020/238476 A1 | 12/2020 |

OTHER PUBLICATIONS

U.S. Appl. No. 18/620,633, filed Mar. 28, 2024, Title: Systems and Methods for Enhanced Video Doorbell Experiences (Not provided; USPTO in possession of specification, claims, and prosecution history).

(Continued)

*Primary Examiner* — Peet Dhillon
(74) *Attorney, Agent, or Firm* — HG LAW LLP

(57) ABSTRACT

Systems and methods of monitoring packages starting from a point of shipment from a warehouse, to delivery at a delivery address, and up to or through a post-delivery event affecting the packages are disclosed. At a first platform associated with a camera located at the delivery address of the package, the package is determined to be delivered at a designated drop-off area associated with the delivery address. Based on determining that the package has been delivered, the designated drop-off area is monitored for movement in relation to the package. Based on detecting movement in the designated drop-off area, a determination is made as to whether the movement is associated with an authorized user or an unauthorized user. Based on determining that the movement is associated with an unauthorized user, an action is performed to address the movement of the unauthorized user in relation to the package.

20 Claims, 9 Drawing Sheets

(56) References Cited

U.S. PATENT DOCUMENTS

| | | | |
|---|---|---|---|
| 11,861,546 B1 | 1/2024 | Wang et al. | |
| 2015/0186842 A1* | 7/2015 | Daniarov | G06Q 10/0838 |
| | | | 705/341 |
| 2016/0343220 A1* | 11/2016 | Grabham | G08B 13/1472 |
| 2018/0121877 A1 | 5/2018 | Doherty et al. | |
| 2019/0156275 A1* | 5/2019 | Fisher | G06Q 10/087 |
| 2019/0161190 A1 | 5/2019 | Gil et al. | |
| 2019/0327449 A1* | 10/2019 | Fu | H04N 7/0806 |
| 2020/0082690 A1* | 3/2020 | Bunker | H04N 7/186 |
| 2020/0122831 A1 | 4/2020 | Rivaya | |
| 2020/0163479 A1* | 5/2020 | Van Valkenburg, III | |
| | | | H04N 23/90 |
| 2023/0089726 A1 | 3/2023 | Subramanian et al. | |
| 2023/0222434 A1 | 7/2023 | Johnson et al. | |
| 2025/0061680 A1 | 2/2025 | Moore et al. | |

OTHER PUBLICATIONS

U.S. Appl. No. 18/620,656 , filed Mar. 28, 2024, Title: Systems and Methods for Enhanced Video Doorbell Experiences (Not provided; USPTO in possession of specification, claims and prosecution history).

"Amazon Drivers Not Following Delivery Instructions," Reddit, Retrieved from https://www.reddit.com/r/AmazonVine/comments/17jkxy0/amazon_drivers_not_following_delivery_instructions/, Retrieved on Mar. 25, 2025, 7 pages.

"How often do Amazon delivery drivers follow customer's instructions?," Quora, Retrieved from https://www.quora.com/How-often-do-Amazon-delivery-drivers-follow-customer-s-instructions, Retrieved on Mar. 25, 2025, 9 pages.

Alexa, Configure an Authorization Code Grant, available online at: <https://developer.amazon.com/en-US/docs/alexa/account-linking/configure-authorization-code-grant.html>, retrieved on Mar. 19, 2025, (1 page).

Amazon, Amazon Key In-Garage Delivery, available online at: <https://www.amazon.com/Amazon-Key-In-Garage-Delivery/b?ie=UTF8&node=21222091011>, retrieved on Mar. 19, 2025 (5 pages).

Bayona, et al., "Comparative Evaluation of Stationary Foreground Object Detection Algorithms Based on Background Subtraction Techniques", 2009 Sixth IEEE International Conference on Advanced Video and Signal Based Surveillance, Sep. 2009 (7 pages).

Gomez et al., "Visual SLAM-based Localization and Navigation for Service Robots: The Pepper Case," RoboCup 2018: Robot World Cup XXII 22. Springer International Publishing, 2019, 12 pages.

He et al., "High-Resolution WiFi Imaging With Reconfigurable Intelligent Surfaces," in IEEE Internet of Things Journal, vol. 10, No. 2, Jan. 15, 2023, pp. 1775-1786.

Huang et al., "WiMANS: A Benchmark Dataset for WiFi-based Multi-user Activity Sensing," European Conference on Computer Vision. Cham: Springer Nature Switzerland, 2024, 39 pages.

Kulchandani, et al., "Moving object detection: Review of recent research trends," 2015 International Conference on Pervasive Computing (ICPC), Pune, India, 2015 (5 pages).

Maruccia, "Wiffract" Wi-Fi method can read letters through walls, Techspot, Retrieved from https://www.techspot.com/news/100151-wiffract-wi-fi-method-can-read-letters-through.html#:%7E:text=With%20the%20appropriate%20mathematical%20model,cone%22%20in%20accordance%20with%20GTD., Sep. 14, 2023, 5 pages.

Papaioannou et al., "Fusion of Radio and Camera Sensor Data for Accurate Indoor Positioning," IEEE 11th International Conference on Mobile Ad Hoc and Sensor Systems, IEEE, 2014, pp. 109-117.

Robertson, "Smaller, faster UPS handheld computer coming to drivers today", available online at: <https://www.theverge.com/2012/2/29/2833318/ups-diad-v-handheld-shipping-computer-launched>, Mar. 1, 2012 (5 pages).

Santoboni et al., "Wireless LAN sensing with smart antennas," 16th European Conference on Antennas and Propagation (EuCAP). IEEE, 2022, 5 pages.

Strohmayer et al., "Directional Antenna Systems for Long-Range Through-Wall Human Activity Recognition," IEEE International Conference on Image Processing (ICIP). IEEE, 2024, 6 pages.

The Essential Oauth Primer: Understanding Oauth for Securing Cloud APIS, whitepaper from Ping Identity, downloadable at https://hub.pingidentity.com/white-papers/3119-essential-oauth-Primer, retrieved on Mar. 19, 2025 (5 pages).

The Truth About Porch Pirates (and How to Stop Them), available online at: <https://www.adt.com/resources/porch-pirates>, retrieved on Mar. 19, 2025 (7 pages).

Unia et al., "Visual-SLAM for Environment Detection and Path Planning," International Research Journal of Engineering and Technology, vol. 7, Issue 10, Oct. 2020, pp. 1340-1343.

Wolfson, "Everything you need to know about Amazon Key In-Garage Delivery, an exclusive Prime member benefit", Amazon, available online at: <https://www.aboutamazon.com/news/amazon-prime/what-is-amazon-key-in-garage-delivery>, Sep. 28, 2023 (5 pages).

* cited by examiner

400

405

Camera Platform DB

404

Camera Platform Server

Control Circuitry
411

I/O Path
412

Storage
414

409

Communication Network

410

Camera

User Equipment

408

425

Delivery Platform DB

424

Delivery Platform Server

Control Circuitry
431

I/O Path
432

Storage
434

407

User Equipment

SYSTEMS AND METHODS FOR PACKAGE MONITORING

BACKGROUND

This disclosure relates to monitoring delivery of packages, such as eCommerce packages, using one or more platforms.

SUMMARY

Many platforms, once an online purchase is made, track the delivery of a package at various locations and times, such as starting from a warehouse (e.g., shipment of the package) and ending at a destination (e.g., delivery of the package at a delivery address). Oftentimes, package recipients may wish to monitor packages after the packages arrive at the destination, as the packages may be left outside of secured premises, such as a porch or driveway, for a period of time such as while the package recipient is at work, on vacation, or otherwise not at the premises, rendering the packages vulnerable. For example, the packages may be stolen, damaged, or tampered with while they remain in unsecured premises. In one approach, security cameras, such as at a residence, school, or business, may be continuously capturing video at a portion of the delivery address, such as a driveway, where the package was left. The user may be notified at their smartphone if any movement is detected by a camera, regardless of whether the movement relates to the package (e.g., a bird flying by the camera). However, such continuous video capture, and notification to a user of any detected motion, inefficiently utilizes a large amount of processing power, storage, and other finite computing and network resources. Such inefficient utilization of computing and network resources is amplified when multiple cameras are used (e.g., for capturing video from different angles at the delivery address). Moreover, continuous video capture can result in videos that include irrelevant footage. Notifications that alert of any detected motion do not indicate which portions, if any, of such videos are relevant to certain parameters desired by the user (e.g., the status or condition of the package). Thus, a user wishing to view surveillance video to check on the package would play recorded footage for longer than needed as they scrub through undetermined amounts of irrelevant footage to find relevant activity, if any. Such operation of computing devices to find relevant video further inefficiently utilizes large amounts of finite computing and network resources. Accordingly, improved methods may be desired for a more efficient use of computing resources in monitoring packages to help ensure that delivered packages make their way within a secured perimeter of customer premises.

In another approach, a delivery driver or other entity associated with the package delivery may provide the customer with a proof of delivery, such as a proof-of-delivery photo or a notification confirming that a code on the package was scanned upon delivery (e.g., at the customer's home). The customer may view the proof of delivery at any time after the package has been delivered. However, the proof of delivery merely provides a static image at one point in time, and provides no measures to notify a user that a package has been stolen or damaged before the customer arrives home.

In one approach, a customer's account (e.g., with Amazon Prime delivery service) may be linked with the customer's smart garage door. When a delivery driver arrives at the customer's garage, the delivery driver may scan the package, which causes the smart garage door to open. Even though such approach may verify the package and driver's location before the door opens, it ends monitoring of the package at the time of delivery. This approach leaves the package vulnerable to being stolen or damaged (e.g., by the delivery driver themselves) between the time it is scanned and when the garage door closes. This approach also leaves the package vulnerable if the delivery driver inadvertently leaves the garage door open after delivery. Additionally, some customers may not have access to a remotely accessible secure premise (such as a smart garage door or smart lock box). Even if they did have access, some customers may not wish to let, or feel comfortable with letting, a stranger into their garage.

To help solve these problems, systems and methods are provided herein for seamlessly transitioning package monitoring operations from a platform associated with delivering the package to a customer's camera system. In some embodiments, a Package Monitoring Application (PMA) is provided for facilitating package monitoring operations between the multiple platforms. In some embodiments, the PMA determines at a first platform associated with a camera (e.g., a camera platform associated with a customer's home, also referred to as a smart home platform or a home automation platform) that a package has been delivered to a designated drop-off area associated with a delivery address of a customer. The PMA causes the camera platform to monitor (e.g., by way of images captured by the camera) for movement in the designated drop-off area in relation to the package. In some embodiments, the images are included in a video captured by the camera. Based on detecting movement in the designated drop-off area in relation to the package, the PMA determines whether the movement is associated with an authorized or unauthorized user or source. If the movement is associated with an unauthorized user, the PMA performs an action to address the movement associated with the unauthorized user in relation to the package.

In some embodiments, the PMA determines that the package has been delivered to the designated drop-off area by receiving an unverified indication that the package has been delivered to the delivery address. Based on the unverified indication, the PMA verifies that the package is located at the designated drop-off area based on the images captured by the camera. The unverified indication can be any suitable indication that purports that the package has been delivered based on a first action, but that may be potentially disproven unless confirmed based on a second action. For example, an unverified indication may be a proof-of-delivery photo that the delivery driver captures and uploads (e.g., the first action) upon dropping off the package. However, the proof of delivery is unverified (e.g., the delivery driver may steal or retain the package after uploading the proof-of-delivery photo or may have delivered the package to the incorrect address) until the PMA compares (e.g., the second action) images of the designated drop-off area that were captured by the camera pre- and post-delivery. Based on comparing the pre- and post-delivery images, the PMA may confirm that the package appears after the delivery driver's arrival at the delivery address and that package remains at the designated drop-off area after the delivery driver leaves, thereby verifying that the package has indeed been delivered.

In some embodiments, the images captured by the camera include images captured prior to determining that the package has been delivered to the designated drop-off area. The images captured by the camera may be included in a video. Based on receiving the unverified indication that the package has been delivered, the PMA may generate a tag. The PMA may associate the tag with a timepoint in the video, wherein the timepoint corresponds to a time when the unverified indication was received. The action performed by the PMA addressing the movement associated with the unauthorized user in relation to the package may comprise providing, to a user device (e.g., of the customer), the video and the tag. The tag may allow for navigating the video directly to the timepoint.

In some embodiments, the performed action comprises sending a notification alerting a user of a user account associated with the package of the movement associated with the unauthorized user in relation to the package.

In some embodiments, the unverified indication is received based on a proof-of-delivery image of the delivered package being uploaded to a second platform (e.g., a delivery platform) associated with the package.

In some embodiments, the unverified indication is received based on scanning a code associated with the package.

In some embodiments, the unverified indication is received based on capturing, by the camera, a first image of the designated drop-off area at a first time prior to the package being delivered. The PMA may detect that a device associated with delivery of the package is within a proximity of the delivery address. For example, the device may include a user device of a delivery driver, a device associated with a delivery vehicle, a delivery drone, or any other suitable device. The PMA may capture a second image of the designated drop-off area at a second time later than the first time.

In some embodiments, the PMA determines that the package has been delivered to the designated drop-off area by causing the camera to capture a first image of the designated drop-off area at a first time prior to the package being delivered. The camera captures a second image of the designated drop-off area at a second time later than the first time. Based on comparing the first image and the second image, the PMA determines that an object has been delivered at the designated drop-off area and identifies the object as the package.

In some embodiments, the PMA determines that the package within a field of view of the camera is at least partially obstructed by a user delivering the package. The PMA delays capture of the second image until the package within the field of view of the camera is no longer obstructed by the user delivering the package.

In some embodiments, the PMA determines that the package within the field of view of the camera is at least partially obstructed by an object. The PMA sends a notification to the user delivering the package to reposition the package so that it is no longer partially obstructed by the object within the field of view of the camera.

In some embodiments, the PMA determines whether the movement is associated with an authorized user or an unauthorized user by, based on the detecting the movement in the designated drop-off area in relation to the package, capturing an image of the designated drop-off area. The PMA detects a user in the captured image and identifies the user by searching a database of images of authorized users for a match with the user in the captured image.

In some embodiments, the first platform (e.g., the camera platform) and a second platform associated with the package (e.g., delivery platform) are communicatively connected by way of an authorization protocol, such as OAuth 2.0.

In some embodiments, if the PMA determines that the movement is associated with an authorized user, the PMA sends a notification alerting the user of the user account associated with the package that an authorized user is interacting with the package. In some embodiments, the notification comprises a user-selectable option to stop recording or to discard the footage of an authorized user interacting with the package.

In some embodiments, the PMA does not send a notification alerting the user of the user account associated with the package if it determines that the movement is associated with an authorized user.

A benefit of the described systems and methods includes optimizing consumption of computing power and resources while maximizing package security by assessing the relevance of detected movement to selectively generate and send notifications regarding the movement and to selectively transmit live media streams or video recordings. For example, because processing (e.g., image processing, motion detection) may be localized to the region of the image occupied by the package, system resources can be conserved while package movement detection can be done more accurately. For example, the PMA may selectively send notifications to the customer and/or selectively request various resources to perform actions (e.g., activate an alarm system, encode and transmit video footage) if certain parameters (e.g., relevant to the status of the package) are satisfied. Meanwhile, the PMA may conserve resources by refraining from sending notifications or action requests when the parameters are not met. Such parameters may include whether movement detected directly affects the package and whether such movement is associated with a person who is authorized to move the package.

For instance, if the PMA detects movement in the designated drop-off area but determines that such movement is not in relation to the package (e.g., a squirrel passes by the package, but the package remains untouched), then the PMA may conserve resources by not sending a notification or video of the squirrel to the customer. Thus, if the PMA determines that irrelevant movement is detected five times before the time a relevant post-delivery event occurs in relation to the package (e.g., a stranger steals it or the customer properly retrieves it), then the PMA avoids inefficiently using resources for transmission of five irrelevant videos.

For instance, based on determining that a detected movement is in relation to the package (e.g., the package is being moved or damaged by a person, an animal, a vehicle driving by, or natural elements such as wind or flooding), the PMA determines whether such movement is associated with an authorized or unauthorized user or source. For example, an authorized user may include the customer, family or anyone in the customer's household, or designated friends and neighbors. For example, an unauthorized user may include specific individuals prohibited by the customer, unknown persons, or certain non-person entities (e.g., animals, weather events, vehicles). If the PMA determines that the movement of the package is associated with an unauthorized user, the PMA may send an alert notifying the customer of the unauthorized movement. The alert may include a user-selectable option to view a live stream of the unauthorized movement of the package and/or perform an action to address the movement (e.g., activate an alarm system). If the PMA determines that the movement of the package is associated with an authorized user, the PMA may: send a notification including a user-selectable option to cancel the alert and the live streaming; determine not to generate and send any notification; cause the camera to discontinue recording; perform any other suitable action; or any combination thereof. As such, bandwidth and other network resources are conserved rather than inefficiently consumed through transmission of unnecessary notifications and videos.

Another benefit includes providing a more efficient UI (user interface) by selectively generating and sending notifications to the user based on assessing the relevance of detected movement to the package. For instance, indiscriminately generating and sending notifications for any detected motion would inefficiently consume resources, especially when a notification is for irrelevant activity (e.g., a bird flies past the camera, another delivery person stops by to drop off a second package but does not disturb the previously delivered package in the same area). With indiscriminate notifications, a customer would not be able to discern the relevance of the movement detected and would have to receive and respond to each notification, thereby consuming power, storage, and other resources on their computing device(s).

Yet another benefit includes limiting the amount of footage stored by the camera(s) and limiting the amount of object detection performed by other cameras. For example, the camera platform may be configured such that a particular camera(s) only monitors for package activity, thereby only storing package related footage. For instance, such a dedicated camera may be located in the designated drop-off area and/or may include the designated drop-off area within its field of view. Meanwhile, another camera located elsewhere at the delivery address (e.g., directed at the driveway) would only be configured to detect for general motion, rather than detecting delivery of the package or identifying (e.g., verifying) the delivered package.

Yet another benefit includes conserving processing power of computing equipment by reducing the time needed to play recorded footage as a customer scrubs through irrelevant footage to reach the relevant images, if any. For example, the PMA may generate and provide metadata to indicate which portions of a video or images are relevant to the package. For instance, by creating a tag associated with a timepoint in the captured images, wherein the timepoint corresponds to a time when the unverified indication was received (e.g., when a proof of delivery is uploaded or when the package is scanned at the delivery address), the customer can use the tag, when viewing the images, to directly navigate to the relevant images or video segments relating to the package. In another example, the PMA may determine whether to send any images at all based on determining whether the detected movement is relevant to the package (e.g., whether a squirrel passed by the undisturbed package or a robber took the package away). For instance, by not sending a notification or video stream if a detected movement is irrelevant (e.g., a squirrel passing by the package), the customer would not need to operate their smartphone to view such irrelevant video.

Yet another benefit includes reducing or eliminating amplification of the aforementioned inefficient consumption of computing resources. For example, multiple (e.g., five) cameras may be installed at different locations at the delivery address (e.g., porch, garage, driveway, sides of the house). When the PMA detects movement associated with a user in the designated drop-off area in relation to the package, the PMA may further determine the trajectory of the user and track the user carrying the package using the multiple cameras. For example, the unauthorized user may retrieve the package from the porch and navigate around the sides of the house, past the garage and down the driveway while carrying off the package. The PMA may, for each footage captured by each of the five cameras, create a tag associated with a timepoint in the respective footage when movement in relation to the package is detected. Transmitting five streams to the customer results in excessive consumption of bandwidth. Therefore, transmitting streams only if detected movement is relevant (e.g., a bird may fly past all of the cameras without affecting the package, or a robber may navigate the premises as they carry the package away) and/or transmitting only the relevant portions of the multiple relevant streams (e.g., tagged portions of the footage from multiple cameras) reduces consumption of bandwidth. Transmitting only the relevant portions of the multiple streams also reduces consumption of power of computing devices, because having only relevant footage based on the tags to review would result in the customer running a media player application for only particular portions of the multiple streams.

Yet another benefit includes reducing security and privacy risks when communicatively connecting multiple platforms, such as linking the e-commerce and camera platforms such that the PMA can transition monitoring activities from one platform to the other. For example, the PMA may securely link the delivery platform and the camera platform using a secure authorization protocol, resulting in reducing the risk of password anti-pattern.

BRIEF DESCRIPTION OF THE FIGURES

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
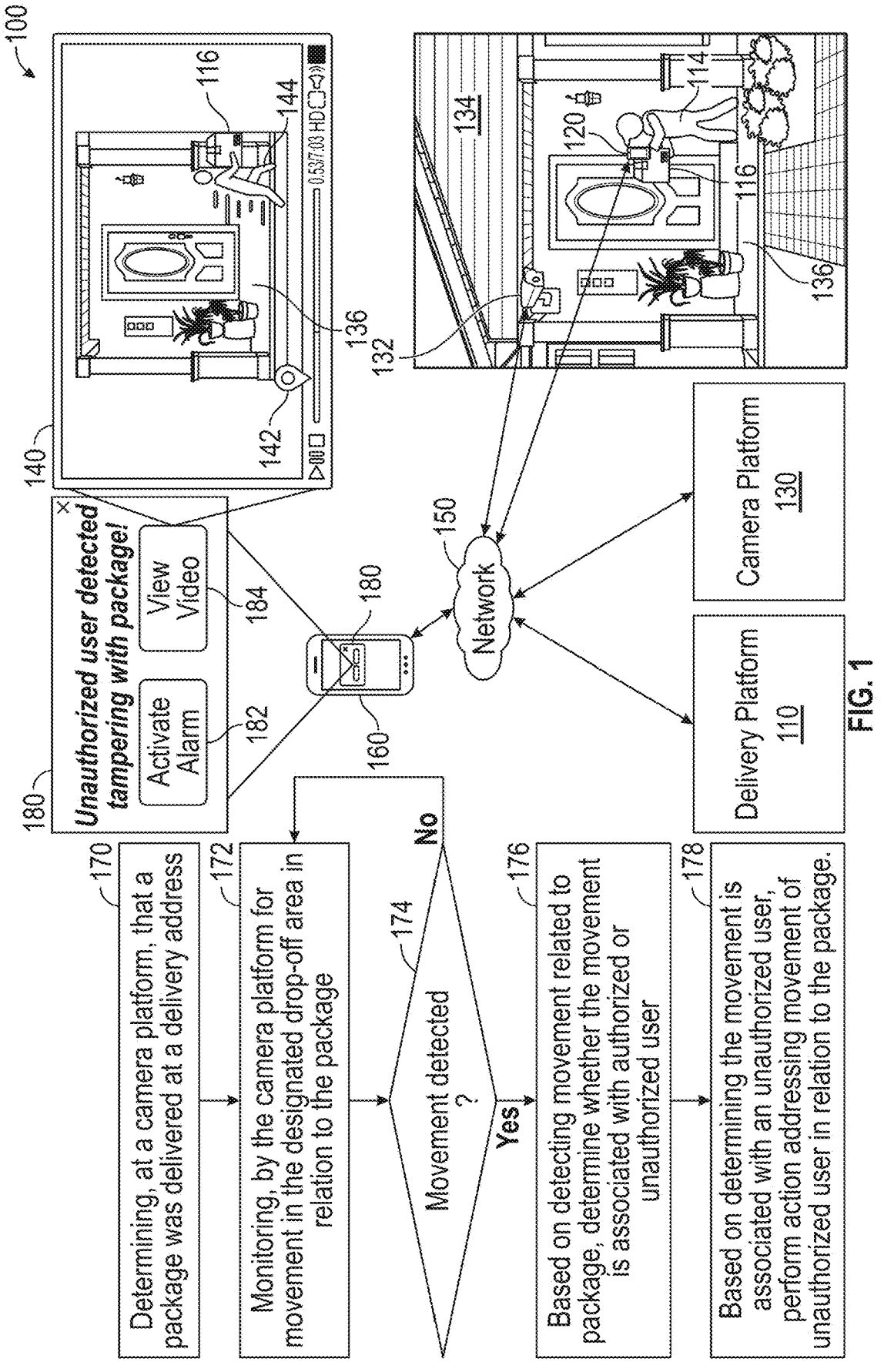
FIG. 1 shows an example scenario of monitoring packages, in accordance with various embodiments of this disclosure.

FIG. 1 shows an example scenario 100 of monitoring packages, in accordance with various embodiments of this disclosure. In some embodiments, scenario 100 comprises a delivery platform 110, camera platform 130, network 150, and user devices 120, 160. In some embodiments, a Package Monitoring Application (PMA) is configured to perform the functionalities (or any suitable portion of the functionalities) described herein. The PMA may facilitate seamless handover of package monitoring operations between a plurality of platforms (e.g., delivery platform 110 associated with delivering the package 116 and camera platform 130 associated with the delivery address 134) that are communicatively connected with each other.

For example, the PMA may monitor packages (e.g., package 116) from their point of shipment (e.g., from a warehouse associated with delivery platform 110), during and after delivery of the packages to a delivery address (e.g., delivery address 134), and during and after a post-delivery event affecting the package (e.g., movement of package 116, such as being retrieved by an authorized user or being stolen by an unauthorized user 144, or wherein package 116 is otherwise damaged or moved in an unauthorized manner). The PMA may determine whether a user involved in the post-delivery event is authorized or unauthorized to interact with the package 116. When the PMA determines a post-delivery event affecting package 116, the PMA may perform certain actions addressing the post-delivery event, such as, for example, alerting the customer associated with the package 116 (e.g., providing a notification 180 to a device 160), notifying a security service provider of the post-delivery event or activating security services, providing relevant images (e.g., photos, video recordings, live media stream) captured by the camera platform 130 and supplemental data associated with the images (e.g., media with inserted tags corresponding to relevant timepoints in the media) relating to the package and the post-delivery event, or other suitable action for addressing the post-delivery event affecting the package 116, or any suitable combination thereof.

Figure 4:
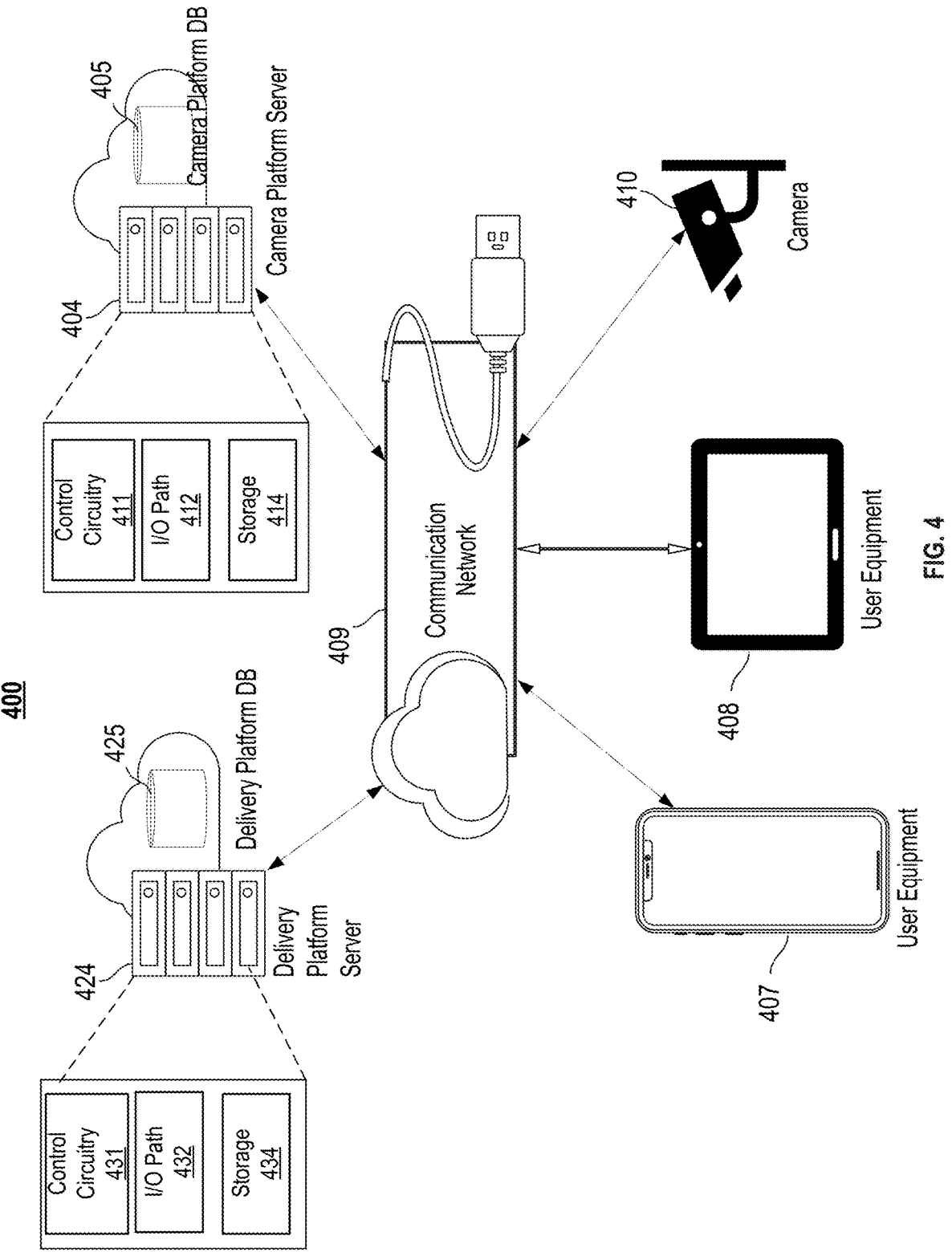
FIG. 4 shows an illustrative system, in accordance with some embodiments of this disclosure, in accordance with various embodiments of the disclosure.

The PMA may be executed at least in part at user device 160, user device 120, delivery platform 110, camera platform 130, databases 405 or 425 of FIG. 4, and/or servers 404 or 424 of FIG. 4, or one or more remote servers (e.g., associated with platform 110 and/or camera platform 130), and/or at or distributed across any of one or more other suitable computing devices, in communication over any suitable type of network (e.g., the Internet, network 150). In some embodiments, platforms 110 and 130 may be controlled by or associated with the same entity. In some embodiments, user device 120 may be, for example, a smartphone, a tablet, a handheld digital assistant, a laptop, a delivery information acquisition device (DIAD), or any other suitable device, or any combination thereof.

In some embodiments, delivery platform 110 comprises any suitable entity(s) that delivers or otherwise provides (or oversees or controls the provision of) an item such as a package 116 to a particular destination location (e.g., delivery address 134). For example, delivery platform 110 may be an e-commerce platform, such as Amazon or another online retailer or a plurality of online retailers that delivers (or otherwise coordinates the delivery of) purchased items to customers. For example, delivery platform 110 may be an online retailer that is communicatively connected with a carrier platform (e.g., a postal service platform, UPS, or other suitable delivery service platform). In another example, delivery platform 110 may be a carrier platform. In some embodiments, delivery platform 110 tracks the location of package 116 (e.g., by way of tracking location data of a user device 120 communicatively connected with delivery platform 110) from a storage associated with delivery platform 110 (e.g., a warehouse or distribution center) to the delivery address 134.

In some embodiments, user device 120 is communicatively connected with delivery platform 110. User device 120 may be associated with a delivery driver 114 (also referred to as delivery person) delivering package 116. Delivery platform 110 may estimate the current location of package 116 until delivery of the package 116 by tracking the location (e.g., GPS data) of user device 120 and/or based on other logistical data (e.g., scheduled pickup of packages). User device 120 may be configurable to provide data indicating the delivery status of package 116 (e.g., by way of providing proof of delivery) to server(s) of platform 110 and/or to device 160 (e.g., as a notification or email or other suitable electronic communication). In some embodiments, user device 120 comprises a computing device, a delivery vehicle, or other suitable operational tool associated with the delivery driver 114 used in delivering package 116.

In some embodiments, camera platform 130 comprises a camera system associated with the delivery address 134. For example, camera platform 130 may comprise at least one camera (e.g., camera 132) or other suitable image-capturing or surveillance equipment. In some examples, camera platform 130 may comprise a smart home system configurable to capture images or video. In some embodiments, the field of view of camera 132 includes a designated drop-off area 136 where package 116 is to be placed upon delivery. Camera 132 may be mounted or positioned at any suitable position in the interior or exterior of the house or building associated with delivery address 134, e.g., at a front door or back door, at a doorbell, at a garage). In some embodiments, the designated drop-off area may be marked or selected by the customer (e.g., via a website or application associated with platform 110 and/or 130) as a visual anchor, or the camera 132 may capture a default area surrounding where it is mounted.

In some embodiments, user device 160 comprises any suitable computing device (e.g., a tablet, a smartphone, a laptop, a desktop computer, a smart watch) configurable to display media or content (e.g., notification 180, any suitable media or content as provided by camera platform 130 and/or platform 110). User device 160 may be associated with a customer associated with package 116 and delivery address 134.

According to some embodiments, at step 170 of FIG. 1, the PMA determines (e.g., at camera platform 130) that package 116 has been delivered at delivery address 134. For example, the PMA may determine that package 116 has been placed at a designated drop-off area 136 associated with the delivery address 134. In some embodiments, the PMA confirms delivery by capturing and comparing images that are captured by camera 132 before and after the PMA receives a trigger comprising an unverified indication that package 116 has been delivered. For example, the unverified indication can be any suitable indication that purports that the package has been delivered based on a first action, but that may be disproven unless confirmed based on a second action. For instance, an unverified indication may be a proof-of-delivery photo that the delivery driver 114 captures and uploads (e.g., the first action) upon dropping off the package 116. However, the proof of delivery is unverified (e.g., the delivery driver 114 may steal the package 116 after uploading the proof-of-delivery photo or may have delivered to the incorrect address) until the PMA compares (e.g., the second action) images of the designated drop-off area 136 that were captured by the camera 132 pre- and post-delivery.

Based on comparing the pre- and post-delivery images, the PMA may confirm that package 116 appears after the delivery driver's 114 arrival at delivery address 134 and that package 116 remains at the designated drop-off area after the delivery driver 114 leaves, thereby verifying that the package 116 has indeed been delivered.

In some embodiments, the PMA receives, at a time prior to receiving the trigger, a notification (e.g., by way of a first application programming interface (API) call to camera platform 130 originating from delivery platform 110) that package 116 is in transit and will soon be arriving at delivery address 134. Based on receiving this notification, the PMA may activate camera 132 to capture a first image of the designated drop-off area 136 (e.g., before package 116 arrives at delivery address 134 and is placed at the designated drop-off area 136). The PMA may then receive the trigger (e.g., by way of a second API call to camera platform 130 originating from delivery platform 110) that comprises an unverified indication that package 116 has been delivered to the delivery address 134. Based on receiving the trigger, the PMA activates camera 132 to capture a second image of the designated drop-off area 136. The PMA may compare the first and second images and perform image analysis, computer vision techniques, or other suitable object detection techniques to identify the presence of package 116 at designated drop-off area 136 and therefore validate the unverified indication. For instance, the PMA may identify the package based on background subtraction, temporal differencing, occlusion detection, or shadow and illumination understanding between the first and second images. For instance, the PMA may identify the package based on detected characteristics (e.g., shape, size, color, a bar code or other identifier, and/or any other suitable characteristic) of the package between the first and second images. Object detection is discussed in more detail in Bayona, et al., "Comparative Evaluation of Stationary Foreground Object Detection Algorithms Based on Background Subtraction Techniques," 2009 Sixth IEEE International Conference on Advanced Video and Signal Based Surveillance, Genova, Italy, September 2009, pp. 25-30, the contents of which are hereby incorporated by reference herein in their entirety.

In some embodiments, the notification comprises a message from delivery platform 110 that the location of delivery driver 114 (e.g., by way of location data of user device 120, a delivery vehicle (not shown) associated with the delivery driver 114, or other suitable object associated with the delivery driver 114 that can be tracked) is approaching or is close to the delivery address 134. In some embodiments, the notification comprises a message from delivery platform 110 that the package 116 has been shipped from the warehouse and is headed toward the delivery address 134. In some embodiments, the notification comprises an estimated delivery time for package 116 from delivery platform 110. Based on receiving the estimated delivery time, the PMA may activate camera 132 to capture the first image of the designated drop-off area 136 within a certain time of the estimated delivery time (e.g., 1 minute before the estimated delivery time, 5 minutes before the estimated delivery time).

In some embodiments, the notification comprises a detection, by camera platform 130, that the package 116 is within proximity of (e.g., within the field of view of the camera and/or within a threshold distance from one or more portions of the delivery address) the delivery address 134. For example, camera platform 130 may comprise a smart home system. The PMA may detect, by way of camera platform 130, that signature characteristics associated with the package 116, the delivery driver 114, and/or user device 120 associated with the delivery driver 114 are present within a certain distance of the delivery address 134. For instance, signature characteristics may include channel state information (CSI) data, image recognition, location data, or other suitable unique identifying data. For instance, the PMA may detect, via camera 132, the presence of delivery driver 114 carrying package 116 as they cross the front yard several steps before reaching the designated drop-off area 136. Based on the detection, the PMA may activate camera 132 to capture the first image of the designated drop-off area 136 within a certain time of the detection (e.g., within 10 seconds of detection, within 30 seconds of detection).

In some embodiments, the notification comprises a confirmation that input from user device 120 was received. For example, when the delivery driver 114 arrives at delivery address 134, they may scan, via user device 120, a code on package 116 before placing package 116 in the designated drop-off area 136. In another example, the delivery driver 114 may provide suitable input via user device 120 (e.g., via a selectable option in a delivery platform 110 delivery workflow menu GUI) indicating that the delivery driver 114 has delivered the package.

In some embodiments, the delivery driver 114 may scan the code on package 116 via camera 132 (e.g., by waving or positioning the package 116 such that the code is in view of camera 132). Scanning of the code by camera 132 may trigger the PMA to send a notification to delivery platform 110 that the package 116 was delivered. Scanning of the code by camera 132 may also trigger the PMA to send an image of the package 116 (e.g., a proof-of-delivery photo) to delivery platform 110. This image may be captured by the same camera 132 that scanned the code. In another example, this image may be captured by a different camera associated with the delivery address 134. For instance, camera 132 by the front door may scan the code on the package 116, and a second camera at the front porch may capture the proof-of-delivery photo of the package 116.

In some embodiments, the notification may be automatically transmitted. For example, the notification may be transmitted based on the PMA detecting that the package 116 is within a particular distance of delivery address 134 (e.g., by way tracking or receiving location data of the package 116 and/or user device 120 of the delivery driver 114). In some embodiments, transmission of the notification is triggered manually (e.g., input from delivery driver 114 via user device 120 indicating that the package 116 has been delivered).

In some embodiments, the PMA receives the trigger based on receiving a proof of delivery uploaded to delivery platform 110. For example, a proof of delivery may be an image or video of the package 116 placed at designated drop-off area 136 that was captured by user device 120. In another example, a proof of delivery may be any suitable document or file transmitted by user device 120 indicating that the package 116 was delivered to delivery address 134. The trigger may be automatically generated based on the user device 120 uploading the proof of delivery to the delivery platform 110. In some embodiments, the PMA receives the trigger when the camera platform 130 receives the uploaded proof of delivery from delivery platform 110.

In some embodiments, the PMA receives the trigger based on the user device 120 (or delivery vehicle or other operational tool associated with the delivery driver 114) leaving the delivery address 134. For example, delivery platform 110 may track location data of the user device 120 to determine that the user device 120 was located at the delivery address 134, has moved in a direction away from the delivery address 134, and is subsequently located at or beyond a certain distance from delivery address 134. Based on the determination that the location of user device 120 has moved away from delivery address 134, the trigger may be automatically generated. In another example, camera platform 130 may detect, based on image analysis and/or location data, that the delivery driver 114 and/or associated user device 120 was located at the delivery address 134 at one point in time, then no longer located at the delivery address 134 at a later point in time.

In some embodiments, the PMA receives the trigger based on the user device 120 scanning a code on the package 116. For example, by scanning the code, the user device 120 sends a message to delivery platform 110 confirming the scan. In some embodiments, the PMA receives the trigger when delivery platform 110 transmits the confirmation of the scan to camera platform 130. In some embodiments, the PMA detects (e.g., based on location data of user device 120) that the package is near the designated drop-off area. The PMA may cause camera 132 to scan the code on package 116. The camera platform 130 may transmit confirmation of the scan to delivery platform 110. Based on a successful scan of the code, the trigger may be automatically generated.

In some embodiments, the PMA receives the trigger based on capturing (e.g., via camera 132) a second image of the designated drop-off area within a certain period of time of detecting that user device 120 is within a certain distance of delivery address 134. For example, the PMA may detect that the delivery driver 114, by way of location data of user device 120, is about to arrive at delivery address 134 (e.g., delivery driver 114 is 10 feet away from reaching delivery address 134). Based on this detection, the PMA may cause camera 132 to capture a second image of the designated drop-off area within a certain period of time (e.g., 30 seconds, during which time the delivery driver 114 will have arrived at delivery address 134 and navigated to the designated drop-off area 136 to deliver package 116). In some embodiments, the PMA may send the second image to delivery platform 110 as a proof-of-delivery photo.

In some embodiments, the PMA confirms that the package 116 has been delivered (e.g., the PMA validates the unverified indication that package 116 has been delivered) by comparing the first and second images. The PMA may perform image analysis, computer vision techniques, object detection (e.g., static object detection), or use other suitable image processing models to identify that a difference between the first and second images comprises the addition of a new object, wherein the new object is the delivered package 116. For example, based on static object detection, the PMA may detect a change between the first and second images by way of a suitable background subtraction model. Additionally, or alternatively, the PMA may detect the change between the first and second images by way of analyzing static objects that are incorporated into a background model of a scene when the background model is updated between frames (e.g., that correspond to the images). Other suitable static detection models may include temporal differencing, occlusion detection, and shadow and illumination understanding. In some examples, the PMA may use a trained machine learning model, such as a deep learning model (e.g., a convolutional neural network (CNN)) to detect and identify physical objects within a frame. For instance, the PMA may use at least one of a variety models, such as You Only Look Once (YOLO), Region-based Convolutional Neural Networks (R-CNN), or other suitable deep learning models or object detection models. In some examples, the PMA may use a suitable object detection model based on illumination conditions and/or shadows within the images captured by camera 132. In some embodiments, the PMA uses object detection to distinguish the recently delivered package 116 from other packages that may have previously been delivered in the same designated drop-off area 136.

In some embodiments, once the PMA detects that an object has been delivered based on comparing the first and second images, the PMA determines that such delivered object is the correct package. For example, the PMA may receive from delivery platform 110 metadata associated with the package 116 (e.g., package dimensions such as size and shape, code affixed to the package, other characteristics of the package) and compare the metadata with characteristics of the detected object of the second image. If a certain amount of the metadata matches at least a portion of the detected object in the second image, the PMA may confirm that the correct package (e.g., package 116) was successfully delivered to delivery address 134. In some instances, the PMA may send a notification to delivery platform 110 confirming successful delivery of the correct package (e.g., validating the unverified indication that package 116 was delivered).

In some embodiments, the PMA compares the uploaded proof-of-delivery photo with the second image to confirm that the package (e.g., displayed in the second image) is the correct package expected for delivery (e.g., package 116 as displayed in the proof-of-delivery photo) and has indeed been delivered to delivery address 134. For instance, the PMA may determine that at least a portion of the characteristics (e.g., shape, size, color, a bar code or other identifier, and/or any other suitable characteristic) of the package in the uploaded proof-of-delivery photo matches at least a portion of the characteristics of the package detected in the second image. In some embodiments, based on the comparison of the uploaded proof-of-delivery photo with the second image and based on applying at least one object detection model, the PMA distinguishes the delivered package 116 from other packages that may be delivered in the same designated drop-off area 136.

In some examples, the package 116 in the second image may be partially occluded (e.g., a portion of the package 116 is covered behind an object such as a structure or plant or is insufficiently illuminated). The PMA may use image data from the uploaded proof of delivery to perform 3D image reconstruction of the occluded portions of the package 116 in the second image. The PMA may then compare the reconstructed image of the package 116 in the second image with the uploaded proof-of-delivery photo to determine whether the package 116 in both scenes are the same.

In some embodiments, upon receiving the trigger to capture the second image, the PMA determines that a temporary obstruction is present within the field of view of camera 132 and waits until the temporary obstruction is no longer blocking camera's 132 view of the package before capturing the second image. For example, the PMA may detect that the delivery driver 114 is present at the designated drop-off area 136 and/or that the delivery driver 114 is temporarily blocking the camera's 132 view of the package 116 as the delivery driver 114 is approaching the designated drop-off area 136 and placing the package 116 there. The PMA may monitor the presence of delivery driver 114 in the designated drop-off area 136 until delivery driver 114 is no longer located at the designated drop-off area 136, until the delivery driver 114 is no longer obstructing at least a portion of the designated drop-off area 136 or the delivered package 116 within the field of view of camera 132, or until the delivery driver 114 is no longer present within the field of view of camera 132. After the PMA detects that delivery driver 114 is no longer obstructing the designated drop-off area 136, the PMA may activate camera 132 to capture the second image of the designated drop-off area 136 (e.g., with an unobstructed view of the package 116).

In some embodiments, the PMA may send instructions to the delivery driver 114 (e.g., by way of transmitting a message through delivery platform 110 to user device 120) to relocate or reposition the package 116 such that the package 116 is visible and unobstructed within the field of view of camera 132. For example, the PMA may detect, by way of object detection of images captured by camera 132 and/or location data of user device 120, that delivery driver 114 has arrived at designated drop-off area 136 and has placed package 116 in the designated drop-off area 136. However, the PMA may determine, by way of object detection of images captured by camera 132, that package 116 is at least partially obstructed or that at least a portion of the package 116 is beyond the field of view of camera 132. For instance, delivery driver 114 may have placed package 116 behind an object such as a bench, too far away from the field of view of camera 132, or at the incorrect delivery address. In another instance, a portion of the package 116 may be otherwise obstructed such that image data of the package 116 collected by camera 132 would be insufficient to identify the package 116. Based on the determination, the PMA may send a notification to the delivery driver 114 to move the package 116 such that camera's 132 view of package 116 is no longer obstructed or such that the package 116 is fully within the field of view of camera 132.

In some embodiments, based on receiving the trigger, the PMA generates a tag 142 to bookmark a relevant portion(s) of the video 140 with respect to the package 116. For example, the images captured by camera 132 may be included in video 140. The tag 142 may be inserted in video 140. The PMA may associate the tag 142 with a particular timepoint(s) (e.g., corresponding to an image(s)) in the video 140. The timepoint may correspond to a time when the PMA received the unverified indication (e.g., trigger). In some embodiments, if the PMA determines that an unauthorized user 144 has moved the package 116 or some other post-delivery event has occurred to the package 116, the PMA may provide, to user device 160, the video 140 with the inserted tag 142. In some examples, the PMA may provide the video 140 and the tag 142 in separate corresponding files (e.g., tag 142 may be provided as a JSON-type file corresponding to the video 140). Tag 142 allows the customer (e.g., by way of user device 160) to navigate the video 140 directly to the timepoint corresponding to tag 142, thereby avoiding the need to scrub through the entire video to find the relevant footage relating to the post-delivery event involving package 116. In some instances, the PMA may send the portion of the video 140 starting from the timepoint corresponding to the tag 142, thereby avoiding transmission and storage of irrelevant portions of the video with respect to the post-delivery event involving package 116.

In some embodiments, the PMA associates the tag 142 with a timepoint in the video 140 corresponding to the time the PMA receives the unverified indication (e.g., the time the proof-of-delivery photo is uploaded to delivery platform 110). In some embodiments, the tag 142 is associated with a timepoint corresponding to the time of delivery indicated by the unverified indication (e.g., the time which the proof-of-delivery photo indicates that the package 116 was dropped off). In some embodiments, the tag 142 is associated with a particular time prior to receiving the unverified indication (e.g., ten seconds before receiving the proof-of-delivery photo). In some embodiments, the PMA obtains metadata associated with the second image (e.g., captured by the camera 132 and sent to the delivery platform 110) to determine the time when the second image was captured. The PMA may associate the tag 142 with that time. In some embodiments, tag 142 is associated with any other suitable timepoint in video 140.

Additionally, or alternatively, in some embodiments, the PMA associates tag 142 with a timepoint in video 140 corresponding to the time when movement of the package is detected (e.g., when a user is picking up the package 116, or an animal or object moves or damages the package 116).

In some embodiments, video 140 is associated with multiple tags relating to the same package 116. For instance, a first tag at a first timepoint may correspond with an estimated time of delivery; a second tag at a second timepoint may correspond with the time the package was dropped off as indicated by the unverified indication; and a third tag may correspond with when the PMA received the unverified indication. In an example, the multiple tags may be inserted into video 140. In another example, the multiple tags may be stored as a collection (e.g., a list of timepoints) in a separate file (e.g., JSON) that references the video 140. In yet another example, each of the multiple tags may be stored in a respective separate file referencing video 140.

In some embodiments, video 140 is associated with multiple tags, each tag corresponding to a different package. For example, the customer may receive three different packages in the same day. For example, each package may be delivered by different vendors (e.g., a first package from Amazon, a second package from UberEATS, and a third package from Walmart). The PMA may generate three different tags, each associated with a respective timepoint in the video 140 when each respective package was delivered (or each respective time when the PMA received an unverified indication for each package).

In some embodiments, the multiple tags are customizable based on various parameters, which may make the multiple tags distinguishable from each other. Such parameters can include, for instance, a vendor associated with the package, type of delivery (food, retail, grocery, pharmacy), package recipient (e.g., multiple recipients residing at delivery address 134 each expect a delivery), or any other suitable parameter. For example, a customer may expect three deliveries, each from a separate vendor. The PMA may customize the tags based on the vendor, which may allow the customer to quickly navigate the video 140 to the specific timepoint corresponding to any one of the deliveries. For instance, the PMA may provide three tags, each including a company logo of the respective vendor. In some examples, the tag itself (e.g., the UI element corresponding to the tag) can comprise the company logo of the corresponding vendor.

In some embodiments, the vendor provides the PMA with metadata associated with the vendor (e.g., an icon) to use as a tag for packages from that vendor. For example, when delivery platform 110 provides the proof-of-delivery photo to the PMA, the delivery platform 110 may also provide the tag (e.g., icon) for that delivery (e.g., by way of the metadata associated with the proof-of-delivery photo). In another example, the delivery platform 110 may provide the tag (e.g., icon) to the PMA each time a delivery (e.g., by delivery platform 110) is made. The icons provided by a vendor may vary based on various parameters, such as seasonal parameters (e.g., a vendor may send the PMA a different icon during the holidays), urgency (e.g., perishable items, time-sensitive items), customer membership level (e.g., delivery for regular or premium subscription), or any other suitable parameter.

In some embodiments, based on receiving the tag, the PMA notifies the customer and provides a UI at user device 160 for the customer to provide delivery instructions directly to the delivery driver 114 (e.g., in real-time, such as via text to user device 120 of the delivery driver 114 or voice communication over a microphone and speaker system associated with delivery address 134).

In some instances, the multiple tags may be inserted into video 140, which the PMA may provide to the customer (e.g., at user device 160). In some instances, the multiple tags may be provided as a collection (e.g., a list of time-points) in a separate file (e.g., JSON) that references the video 140. In some instances, each tag may be provided in a respective separate file referencing video 140. In some instances, the PMA may provide a separate file for multiple tags corresponding to the same vendor (e.g., tags corresponding to multiple deliveries by Amazon in a first JSON file, tags corresponding to multiple deliveries by UberEATS in a second JSON file), or corresponding to other suitable parameters.

In some embodiments, the PMA propagates the tag(s) to multiple cameras. For example, if the PMA detects, via camera 132, that the package 116 is being moved at a particular time, the PMA may create tag 142 associated with that timepoint. The PMA may send the tag 142 to other cameras associated with the delivery address 134. Thus, tagged footage from the multiple cameras may capture the movement of the package from various angles and locations.

In some embodiments, the tag 142, and/or metadata of the tag 142, includes any suitable information relating to the package 116 (e.g., time of delivery, delivery address, vendor, package contents, package priority). For example, metadata associated with the tag 142 may include information associated with the unverified indication and the time when the package 116 was delivered. For example, tag 142 may include an image of the item(s) being delivered within package 116. In some embodiments, the tag 142 includes metadata (such as key terms, e.g., relating to the package vendor, package contents, time frame encompassing a deliver time) such that the PMA can perform queries based on the tag 142. For example, a customer may provide the PMA with a voice or text command, "Show me the UberEATS delivery footage." Based on terms in the query and the metadata of tag 142, the PMA may identify the matching tag and provide the customer (e.g., at user device 160) with the tag and the corresponding video.

According to some embodiments, at step 172 of FIG. 1, the PMA monitors, via camera platform 130, for movement in the designated drop-off area 136 in relation to the package 116. For example, a post-delivery event may occur involving the package 116, such as a user arriving at designated drop-off area 136 to pick up package 116. In some instances, when the PMA begins monitoring for movement, the PMA sends a message (such as a push notification or other suitable notification) to user device 160 that the package 116 has been received and is being monitored for movement. The PMA may perform image analysis on the images captured by camera 132 to determine movement of the package 116 based on any suitable moving object detection models (e.g., background subtraction, frame differencing, temporal differencing, optical flow, occlusion detection, or shadow and illumination understanding). Moving object detection is discussed in more detail in Kulchandani, et al., "Moving object detection: Review of recent research trends," 2015 International Conference on Pervasive Computing (ICPC), Pune, India, 2015, pp. 1-5, the contents of which are hereby incorporated by reference herein in their entirety.

In some embodiments, the PMA may continuously capture the images of the designated drop-off area 136 via camera 132 over a period of time that includes the movement of the package 116 (e.g., between confirming that the package 116 was delivered and up to or until a certain time after subsequent movement of the package 116 occurs). In some instances, the PMA may periodically activate camera 132 to capture images of the designated drop-off area 136 for this period of time. In some instances, if the PMA does not detect movement, the PMA may capture images at certain time intervals. Once movement is detected, the PMA may increase the capture at faster time intervals or shift to continuous capture (or video). In some instances, as the camera's 132 image sensor can be high power consuming, the camera 132 may be configured to monitor for movement using passive infrared (PIR)-based continuous or periodic detection, thereby ensuring low power consumption. Once movement has been detected, the camera 132 is configured to activate and switch to using the camera's 132 image sensor, to continue monitoring the detected movement. For example, the camera 132 may use PIR to detect that movement has occurred in the designated drop-off area 136. When such movement is detected, the camera 132 switches to using its image sensors to capture higher-quality images for identifying who or what is moving the package 116.

In some embodiments, in a situation where the delivery address 134 is associated with multiple cameras, the PMA configures certain dedicated cameras to only monitor for package activity, thus limiting the amount of footage stored by the dedicated cameras. For example, the PMA may dedicate those cameras that have a field of view that includes the designated drop-off area 136. The footage stored by the dedicated cameras may be limited to package-related content (e.g., footage taken when a package is expected to be delivered). Dedicating certain cameras for monitoring for package activity may also reduce the amount of object detection performed by other (e.g., non-dedicated) cameras. For instance, a camera directed at designated drop-off area 136 may monitor for package activity and use object detection to verify whether the correct package was delivered. Meanwhile, a camera directed at the driveway of the delivery address 134 would not be configured to monitor for package activity (e.g., detecting delivery of the package or verifying that the delivered package is the correct package). Rather, the camera in the driveway would be configured to merely detect for general motion (e.g., if user 144 steals the package and passes by the driveway camera as they leave the delivery address 134).

According to some embodiments, at step 174 of FIG. 1, the PMA detects if movement is occurring and determines if the movement is in relation to the package (e.g., if the movement is affecting the package). For instance, if the PMA detects a squirrel passing by the package 116 or a bird flying by camera 132, but package 116 remains undisturbed, then the PMA may determine that the detected movement is irrelevant (e.g., not in relation) to package 116 and will not generate and send a notification alerting the customer about it. For instance, if the PMA detects that a family member comes by to retrieve the package 116, or that a bear, vehicle, stranger, or flood moves and/or damages the package 116, then the PMA may determine that the detected movement is in relation to the package and may generate and send a notification 180 alerting the customer of the movement of the package. The PMA may further determine whether the movement of the package is associated with an authorized user or source (e.g., the family member) or an unauthorized user or source (the bear, vehicle, stranger, flood). In some instances, the PMA may generate and send a notification of the movement of the package and an indicating whether the movement is caused by an authorized or unauthorized user. In some instances, the PMA may generate and send the notification only if the movement is caused by an unauthorized user.

In some embodiments, the PMA may provide a UI element through which the customer can provide data associated with various individuals to add to profiles of authorized users, which are maintained in a database of profiles (e.g., including images) of authorized and/or unauthorized users or sources. For instance, the customer may add images and other identity information of their family members and close friends and indicate them as authorized users. Likewise, the customer may add images and other identity information of specific individuals and indicate them as unauthorized users. In some instances, the PMA can activate camera 132 to capture an image of a new user and add the image to the database of authorized users. In some instances, the PMA can capture the image of the new user and send it to the customer at user device 160 for approval to allow the new user to interact with package 116 (e.g., with a user-selectable prompt to indicate whether the new user is a trusted person). In some instances, the PMA can add new users to the database of authorized and/or unauthorized user based on any suitable method.

In some embodiments, various parameters are applied to the list of authorized and/or unauthorized users, such as dates and times or types of packages that a user is authorized to pick up, or other suitable parameters. For instance, a customer may plan to be on a vacation for two weeks and can temporarily assign their neighbor as an authorized user during those two weeks to retrieve packages. If the PMA detects that the neighbor picks up a package from delivery address 134 during the authorized time period, the PMA may send an alert to user device 160 to notify the customer that the neighbor has moved the package and was authorized to do so, or the PMA may not send any alerts at all because the neighbor is authorized during that time. For instance, a customer may expect a child's surprise gift to be delivered and authorize only themselves and their spouse to pick up the gift when it arrives. The child may be an authorized user to pick up most packages, but is assigned as an unauthorized user for the particular gift. If the PMA detects that the child picks up the gift, the PMA may send an alert (e.g., notification 180) to user device 160 to notify the customer of this. If the PMA detects that the child picks up any package other than the gift, the PMA may not send any alerts to the customer.

In some embodiments, the PMA may learn which users are authorized based on user behavior or patterns. For instance, the PMA may use a trained machine learning model to determine that certain users who visit the delivery address 134 at a certain frequency or period of time are authorized users. In some embodiments, the PMA updates the database of authorized users based on the received response to the alert. For instance, if the customer selects to ignore an alert (e.g., notification 180), the PMA may classify the user as an authorized user and update the database of authorized and/or unauthorized users. For instance, if the customer selects to take a security action, the PMA may classify the user as an unauthorized user and update the database of authorized and/or unauthorized users accordingly.

According to some embodiments, if the PMA detects that movement of package 116 has occurred, then, at step 176 of FIG. 1, the PMA determines whether the movement is associated with an authorized or unauthorized user or source. For example, the PMA may detect that a user 144 (or other source, such as an animal, object, or element of nature) is present in the designated drop-off area 136 at the same time the movement of the package 116 is detected. The PMA may perform facial recognition or other suitable image recognition on the image of the user 144 and compare the facial or other visual features of the user 144 with facial or other visual features maintained in a database of profiles of authorized and/or unauthorized users or sources. For instance, if the features of user 144 do not match any user in the database (e.g., user 144 is a stranger, an animal, a vehicle, or flooding), or matches a particular unauthorized user (e.g., user 144 is an individual prohibited from delivery address 134), then the PMA determines that user 144 is an unauthorized user. For instance, if the PMA determines that at least a portion of visual features of user 144 matches those of a particular authorized user, then the PMA may determine that the user 144 is an authorized user.

In some embodiments, the PMA may identify the user 144 based on any other suitable recognition technique. For example, the PMA may collect wireless signal characteristic data (e.g., device identity derived from a radio frequency (RF) beacon, or other suitable unique identifier data) of the user 144 or user device 120 (e.g., by way of a smart home system associated with camera platform 130) and compare the collected data with wireless signal characteristics maintained in a database of authorized and/or unauthorized user profiles or of user devices associated with such profiles. In some embodiments, user device 120 may be associated with a unique identifier, which is detected in a vicinity of delivery address 134, that indicates that the user is authorized. In some embodiments, camera 132 and user device 120 may exchange data that indicates that user device 120 is authorized to interact with packages at delivery address 134.

In some embodiments, the PMA may identify the user 144 based on location data of the user 144 (e.g., tracking the movement of the user 144). For example, if user 144 picks up package 116 and enters the home, the PMA may determine that user 144 is a member of the household of delivery address 134 and is an authorized user. If user 144 picks up the package 116 and walks away from the delivery address 134, the PMA may determine that the user does not belong to the household of delivery address 134 and intends to steal the package from the premises and is therefore an unauthorized user.

According to some embodiments, at step 178 of FIG. 1, based on determining, at step 176, that the movement in relation to the package 116 is associated with an unauthorized user, the PMA performs an action addressing such movement. For example, the action may comprise: initiating recording (e.g., activating higher-quality recording functions of camera 132 or switching from capturing photos to capturing video, or activating other cameras around the delivery address 134 to follow the trajectory and capture the path of unauthorized user 144 leaving with the package 116); initiating an alarm system, a neighborhood watch system, or other security system; contacting security services or delivery platform 110; notifying user device 160 of the package being interacted with by an unauthorized user; any other suitable action for monitoring, replacing, or securing the package 116; or a combination thereof.

Additionally, or alternatively, the PMA may provide relevant video 140 (e.g., with tag 142, either inserted in video 140 or as a separate file corresponding to video 140) of the movement of the package 116, for instance by providing a link (e.g., via option 184) to user device 160 to view the video 140. In some embodiments, video 140 is a previously recorded video. In some embodiments, the video 140 is a live stream video.

In some embodiments, the PMA may send an alert such as notification 180 (e.g., to user device 160) notifying the customer of the movement of the package 116 and including one or more user-selectable options (e.g., options 182, 184). For example, a user-selectable option may include an option to perform any one or a combination of the aforementioned actions (e.g., option 182 to activate an alarm, option 184 to select a link to view video 140). Additionally, or alternately, a user-selectable option may include an option to cancel the alert (e.g., if the user moving package 116 is an authorized user). For instance, the option to cancel the alert may include an option to dismiss the notification, discontinue monitoring the designated drop-off area 136, or discard the video or images of the authorized user moving package 116.

In some embodiments, the PMA may send the alert when the PMA detects movement of the package 116, irrespective of the identity of the user 144 moving it. For example, the alert may include information on whether the user 144 moving the package 116 is an authorized or unauthorized user and a user-selectable option to take further action or cancel the notification. For instance, if the alert indicates that the user 144 is an authorized user, the customer may choose to decline to take further action and cancel the notification. If the alert indicates that the user 144 is an unauthorized user, the customer may choose to take further action.

In some embodiments, the PMA may send the alert only when the PMA detects movement of the package 116 and identifies the user 144 as an unauthorized user.

Figure 2:
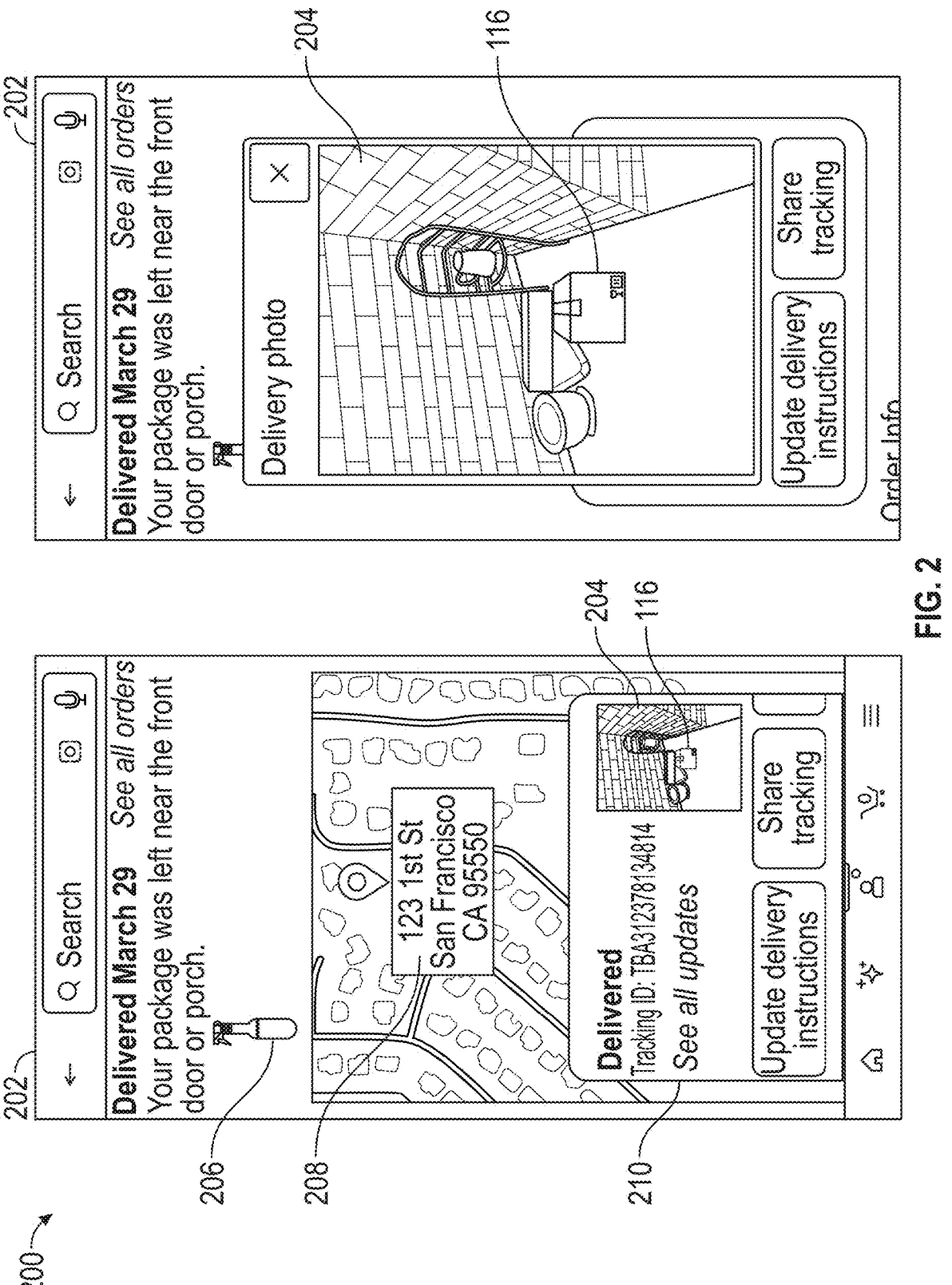
FIG. 2 shows an example unverified indication of package delivery in monitoring packages, in accordance with various embodiments of this disclosure.

FIG. 2 shows an example unverified indication 200 of package delivery in monitoring packages, in accordance with various embodiments of this disclosure. In some embodiments, the unverified indication 200 can be any suitable indication that purports that the package has been delivered based on a first action, but that may be disproven unless confirmed based on a second action. For example, unverified indication 200 may comprise a proof-of-delivery image 204 of a package (such as package 116 of FIG. 1) that is captured and uploaded (e.g., the first action) to delivery platform 110 when delivery driver 114 drops off the package 116 at delivery address 134. The proof-of-delivery image 204 may be captured and uploaded in various ways, such as via a user device 120 associated with the delivery driver, or via a camera 132 associated with the delivery address 134. The proof-of-delivery image 204 remains unverified (e.g., the delivery driver 114 may steal the package 116 after uploading the proof-of-delivery image 204 or may have delivered to the incorrect address) until a second action occurs (e.g., the camera 132 compares images of the designated drop-off area 134 captured pre- and post-delivery). Based on comparing the pre- and post-delivery images, the PMA may confirm that package 116 appears after the delivery driver's 114 arrival at delivery address 134 and that package 116 remains at the designated drop-off area after the delivery driver 114 leaves, thereby verifying that the package 116 has indeed been delivered.

Although the example unverified indication 200 in FIG. 2 is shown as a proof-of-delivery image 204, it is understood that the unverified indication can comprise other suitable indications of package delivery. For instance, an unverified indication may be received by scanning (e.g., by a user device 120 of the delivery driver 114 or by a camera 132 of the delivery address 134) of a code on the package 116 upon delivery. For instance, an unverified indication may be received by capturing (e.g., by the camera 132 of the delivery address 134) an image of the designated drop-off area 136 during a certain time after detecting a proximity of the delivery driver 114 (e.g., by way of location data of user device 120) to the delivery address 134.

In some embodiments, the delivery platform 110 may present the proof-of-delivery image 204 by way of a graphical user interface 202 displayed on a user device 160 of the customer. The proof-of-delivery image 204 may include, or be supplemented by, data about the delivered package 116, such as the location 208 of the delivery address 134, delivery tracking number 210, and package contents 206.

In some embodiments, receiving the unverified indication triggers the PMA to insert a tag 142 in the video 140 (e.g., comprising the images captured by the camera 132) to bookmark the timepoint in the video 140 when the package 116 was delivered. In some embodiments, the PMA provides the tag 142 in a separate file (e.g., JSON file) corresponding to the video 140.

Figure 3:
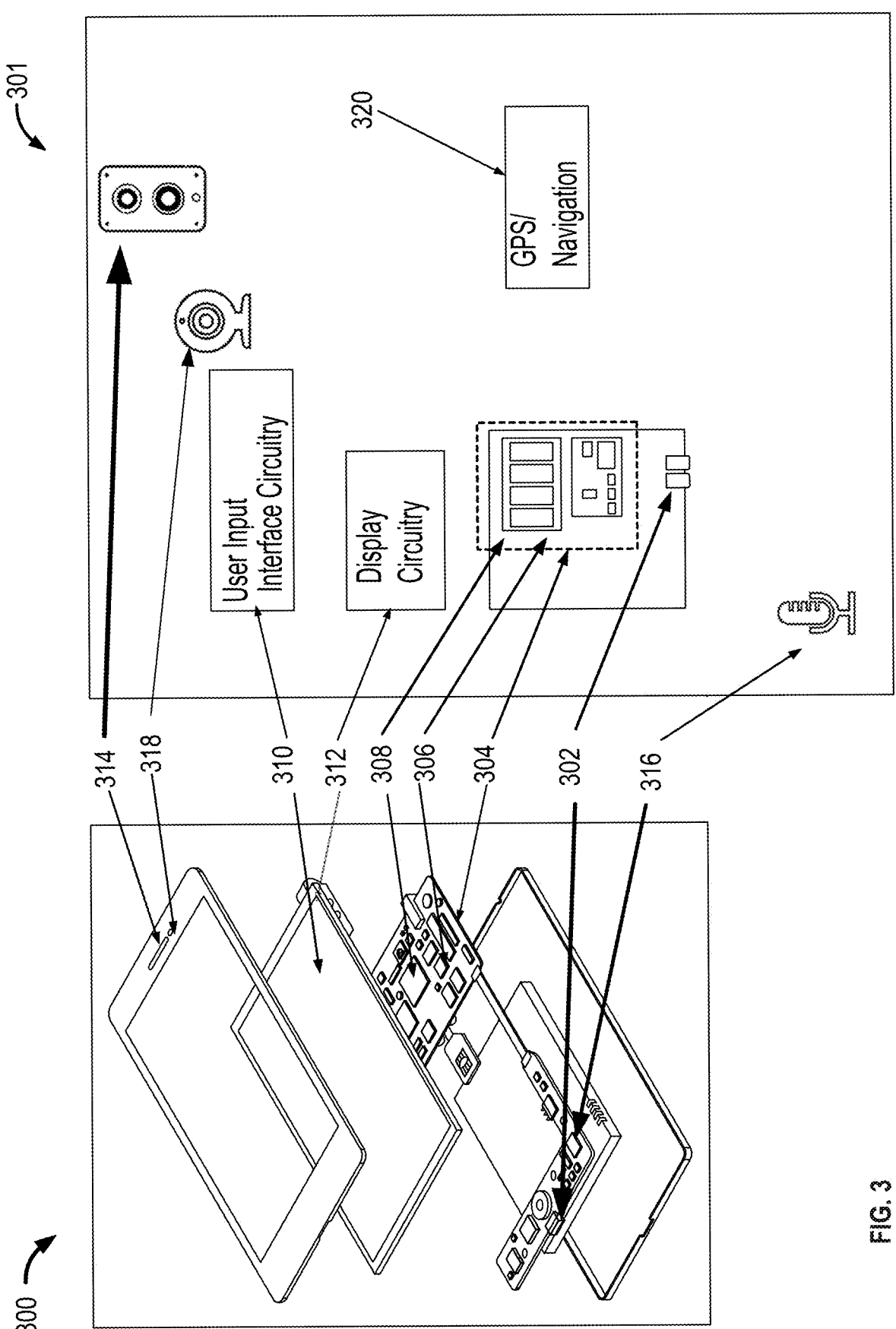
FIG. 3 shows an illustrative user equipment device, in accordance with some embodiments of this disclosure.

FIGS. 3-4 depict illustrative devices, systems, servers, and related hardware for monitoring packages, in accordance with some embodiments of this disclosure. FIG. 3 shows generalized embodiments of illustrative user equipment devices 300 and 301, which may correspond to the above-described user devices (e.g., user devices 120, 160). In some embodiments, user equipment device 300, 301 is a smartphone device, a tablet, smart TV, IoT device, smart assistant device or home assistant device, a camera device or any other suitable computing device, a network-based server hosting a user-accessible client device, a non-user-owned device, any other suitable device, or any combination thereof. Each of user equipment device 300, 301 is communicatively connected to at least one of microphone 316, audio input equipment, camera 318, display circuitry 312, user input interface circuitry 310, and GPS/navigation circuitry 320. For example, display 312 may be a computer display, a 3D display (such as, for example, a tensor display, a light field display, a volumetric display, a multi-layer display, an LCD display or any other suitable type of display, or any combination thereof). For example, user input interface 310 may be a remote-control device.

In some embodiments, each one of user equipment device 300, 301 receives content and data via input/output (I/O) path (e.g., circuitry) 302. I/O path 302 provides data to control circuitry 304, which comprises processing circuitry 306 and storage 308. Control circuitry 304 is used to send and receive commands, requests, and other suitable data using I/O path 302, which comprises I/O circuitry. I/O path 302 connects control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable control circuitry such as processing circuitry 306. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for the PMA or other suitable appli-cation stored in memory (e.g., storage 308). Specifically, control circuitry 304 may be instructed by the PMA to perform the functions discussed above and below. In some implementations, processing or actions performed by con-trol circuitry 304 may be based on instructions received from the PMA, the delivery platform and/or the smart home/camera platform.

In some client/server-based embodiments, control cir-cuitry 304 may include communications circuitry suitable for communicating with a server or other networks or servers. The PMA is a stand-alone application implemented on a device or a server. The PMA may be implemented as software or a set of executable instructions. The instructions for performing any of the embodiments discussed herein of the PMA may be encoded on non-transitory computer-readable media (e.g., a hard drive, random-access memory on a DRAM integrated circuit, read-only memory on a BLU-RAY disk, etc.). For example, in FIG. 3, the instruc-tions may be stored in storage 308, and executed by control circuitry 304 of a device 300, 301.

In some embodiments, the PMA is a client/server appli-cation where only the client application resides on device 300, 301 and a server application resides on an external server (e.g., server 404, 424). For example, the PMA may be implemented partially as a client application on control circuitry 304 of device 300, 301 and partially on server 404, 424 as a server application running on control circuitry 411, 431, respectively. Server 404, 424 may be a part of a local area network with one or more of devices 300, 301 or may be part of a cloud computing environment accessed via the internet. In a cloud computing environment, various types of computing services for performing searches on the internet or informational databases, providing encoding/decoding capabilities, providing storage (e.g., for a database) or parsing data (e.g., using machine learning algorithms described above and below) are provided by a collection of network-accessible computing and storage resources (e.g., server 404, 424), referred to as "the cloud." Device 300, 301 may be a cloud client that relies on the cloud computing capabilities from server 404, 424 to receive and process encoded data. When executed by control circuitry of server 404, 424 the PMA instructs control circuitry 411, 431, respectively, to perform processing tasks for the client device.

Control circuitry 304 may include communications cir-cuitry suitable for communicating with a server, edge com-puting systems and devices, a table or database server, or other networks or servers. The instructions for carrying out the above-mentioned functionality may be stored on a server (which is described in more detail in connection with FIG. 4). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Stor-age 308 may be used to store various types of content described herein as well as media application and/or gaze mapping application data described above. Nonvolatile memory may also be used (e.g., to launch a boot-up routine and other instructions). Cloud-based storage, described in relation to FIG. 3, may be used to supplement storage 308 or instead of storage 308.

Control circuitry 304 may include video generating cir-cuitry and tuning circuitry, such as one or more analog tuners, one or more H.265 decoders or any other suitable digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downcon-verting content into the preferred output format of user equipment 300, 301. Control circuitry 304 may also include digital-to-analog converter circuitry and analog-to-digital converter circuitry for converting between digital and analog signals. The tuning and encoding circuitry may be used by user equipment device 300, 301 to receive and to display, to play, or to record content. The tuning and encoding circuitry may also be used to receive video encoding/decoding data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) func-tions, multiple-tuner recording, etc.). If storage 308 is pro-vided as a separate device from user equipment device 300, the tuning and encoding circuitry (including multiple tuners) may be associated with storage 308.

Control circuitry 304 may receive instruction from a user by way of user input interface circuitry 310. User input circuitry 310 may be any suitable user interface circuitry, such as a remote control, mouse, trackball, keypad, key-board, touch screen, touchpad, stylus input, joystick, voice recognition interface, or other user input interfaces. Display circuitry 312 may be provided as a stand-alone device or integrated with other elements of each one of user equip-ment device 300, 301. For example, display circuitry 312 may be a touchscreen or touch-sensitive display. In such circumstances, user input interface circuitry 310 may be integrated with or combined with display circuitry 312. In some embodiments, user input interface circuitry 310 includes a remote-control device having one or more micro-phones, buttons, keypads, any other components configured to receive user input or combinations thereof. For example, user input interface circuitry 310 may include a handheld remote-control device having an alphanumeric keypad and option buttons.

Audio output equipment 314 may be integrated with or combined with display circuitry 312. Display circuitry 312 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display circuitry 312. Audio output equipment 314 may be provided as integrated with other elements of each one of device 300 and equipment 301 or may be stand-alone units. An audio component of videos and other content displayed on display circuitry 312 may be played through speakers (or headphones) of audio output equipment 314. In some embodiments, audio may be distributed to a receiver (not shown), which processes and outputs the audio via speakers of audio output equipment 314. In some embodiments, for example, control circuitry 304 is configured to provide audio cues to a user, or other audio feedback to a user, using speakers of audio output equipment 314. There may be a separate microphone 316 or audio output equipment 314 may include a microphone configured to receive audio input such as voice commands or speech. For example, a user may speak letters or words that are received by the microphone and converted to text by control circuitry 304. In a further example, a user may voice commands that are received by a microphone and recognized by control circuitry 304. Camera 318 may be any suitable video camera integrated with the equipment or externally connected. Camera 318 may be a digital camera comprising a charge-coupled device (CCD) and/or a complementary metal-oxide semiconductor (CMOS) image sensor. Camera 318 may be an analog camera that converts to digital images via a video card.

The PMA may be implemented using any suitable architecture. For example, it may be a stand-alone application wholly-implemented on each one of user equipment device 300 and user equipment device 301. In such an approach, instructions of the application may be stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to provide encoding/decoding functionality and preform any of the actions discussed herein. Based on the processed instructions, control circuitry 304 may determine what action to perform when input is received from user input interface circuitry 310. For example, movement of a cursor on a display up/down may be indicated by the processed instructions when user input interface circuitry 310 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the PMA is a client/server-based application. Data for use by a thick or thin client implemented on each one of user equipment device 300 and user equipment device 301 may be retrieved on-demand by issuing requests to a server remote to each one of user equipment device 300 and user equipment device 301. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on device 300, 301. This way, the processing of the instructions is performed remotely by the server while the resulting displays (e.g., that may include text, a keyboard, or other visuals) are provided locally on device 300, 301. Device 300, 301 may receive inputs from the user via input interface circuitry 310 and transmit those inputs to the remote server for processing and generating the corresponding displays. For example, device 300, 301 may transmit a communication to the remote server indicating that an up/down button was selected via input interface circuitry 310. The remote server may process instructions in accordance with that input and generate a display of the application corresponding to the input (e.g., a display that moves a cursor up/down). The generated display is then transmitted to device 300, 301 for presentation to the user.

In some embodiments, the PMA may be downloaded and interpreted or otherwise run by an interpreter or virtual machine (run by control circuitry 304). In some embodiments, the PMA may be encoded in the ETV Binary Interchange Format (EBIF), received by control circuitry 304 as part of a suitable feed, and interpreted by a user agent running on control circuitry 304. For example, the media application and/or gaze mapping application may be an EBIF application. In some embodiments, the PMA may be defined by a series of JAVA-based files that are received and run by a local virtual machine or other suitable middleware executed by control circuitry 304. In some of such embodiments (e.g., those employing MPEG-2 or other digital media encoding schemes), the PMA may be, for example, encoded and transmitted in an MPEG-2 object carousel with the MPEG audio and video packets of a program.

FIG. 4 is a diagram of an illustrative system 400, in accordance with some embodiments of this disclosure. System 400 may comprise user equipment devices 407, 408, and/or 410 and/or any other suitable number and types of user equipment, capable of transmitting data by way of communication network 409. Communication network 409 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 409) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 4 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 409.

System 400 may comprise camera platform data source 405, delivery platform data source 425, and/or one or more servers 404, 424. In some embodiments, the PMA may be executed at one or more of control circuitry 411, 431 of servers 404, 424 respectively (and/or control circuitry of user equipment devices 407, 408, 410).

In some embodiments, servers 404, 424 include control circuitry 411, 431 and storage 414, 434 (e.g., RAM, ROM, Hard Disk, Removable Disk, etc.), respectively. Storage 414, 434 may store one or more databases. Server 404, 424 may also include an input/output path 412, 432, respectively. I/O path 412, 432 may provide encoding/decoding data, device information, or other data, over a local area network (LAN) or wide area network (WAN), and/or other content and data to control circuitry 411, 431, which may include processing circuitry, and storage 414, 434, respectively. Control circuitry 411, 431 may be used to send and receive commands, requests, and other suitable data using I/O path 412, 432, respectively, which may comprise I/O circuitry. I/O path 412, 432 may connect control circuitry 411, 431, respectively (and specifically control circuitry) to one or more communications paths.

Control circuitry 411, 431 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry 411, 431 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 411, 431 executes instructions for an emulation system application stored in memory (e.g., the storage 414, 434, respectively). Memory may be an electronic storage device provided as storage 414, 434 that is part of control circuitry 411, 431, respectively.

Camera platform data source 405, delivery platform data source 425, servers 404, 424, or any combination thereof, may include an encoder. Such encoder may comprise any suitable combination of hardware and/or software configured to process data to reduce storage space required to store the data and/or bandwidth required to transmit the image data, while minimizing the impact of the encoding on the quality of the media content being encoded. In some embodiments, the data to be compressed may comprise a raw, uncompressed 3D media content, or 3D media content in any other suitable format. In some embodiments, each of user equipment devices 407, 408, and/or 410 may receive encoded or encoded data locally or over a communication network (e.g., communication network 409 of FIG. 4) and may comprise one or more decoders. Such decoder may comprise any suitable combination of hardware and/or software configured to convert data in a coded form to a form that is usable as video signals and/or audio signals or any other suitable type of data signal, or any combination thereof. User equipment devices 407, 408, and/or 410 may be provided with encoded data. In some embodiments, at least a portion of decoding may be performed remote from user equipment devices 407, 408, and/or 410.

FIGS. 5-8 are system sequence diagrams and flowcharts of various processes 500-800, respectively. In various embodiments, the individual steps of each process 500-800 may be implemented by one or more components of the devices and systems of FIGS. 3-4. Although the present disclosure may describe certain steps of each process 500-800 (and of other processes described herein) as being implemented by certain components of the devices and systems of FIGS. 3-4, this is for purposes of illustration only, and it should be understood that other components of the devices and systems of FIGS. 3-4 may implement those steps instead. For example, the steps of each process 500-800 may be executed by server 404, 424 and/or by user equipment device 407, 408, and/or 410 and/or by control circuitry 304 of a device 300, 301 and/or by control circuitry 411, 431 for package monitoring.

Figure 5:
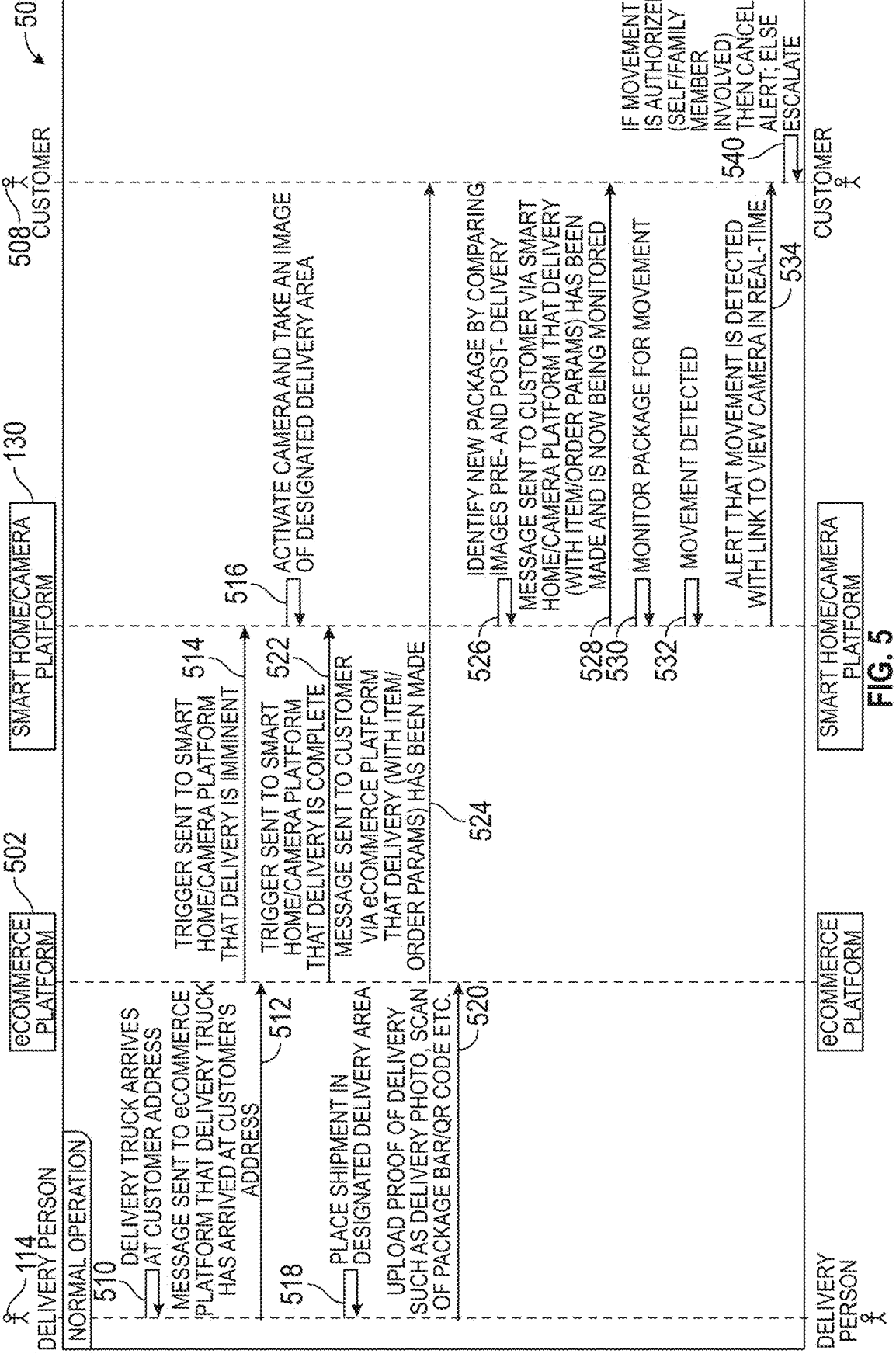
FIG. 5 is a system sequence diagram of an illustrative process for monitoring packages, in accordance with various embodiments of the disclosure.

FIG. 5 is a system sequence diagram of an illustrative process 500 for monitoring packages, in accordance with various embodiments of the disclosure. In some embodiments, at step 510, delivery driver 114 (also referred to as delivery person) arrives at the customer address (e.g., delivery address 134). In some embodiments, at step 512, a user device 120 associated with the delivery driver 114 sends a message to delivery platform 110 that the delivery driver 114 has arrived at the delivery address 134. For example, the message may comprise location data of the user device 120. E-commerce platform 502 (e.g., which may correspond with delivery platform 110 of FIG. 1) may determine a match between the location data of the user device 120 and the location of the delivery address 134. Although the example as shown uses e-commerce platform 502, it is understood that any delivery platform or other suitable platform for delivering packages may be used.

In some embodiments, at step 514, when e-commerce platform 502 determines that the delivery driver 114 is located at the delivery address, e-commerce platform 502 sends a first trigger (e.g., a notification) to camera platform 130 (also referred to as smart home/camera platform) that delivery of the package is imminent (e.g., will be delivered at designated drop-off area 136 within a certain period of time, such as 10 seconds). For instance, the notification may be sent by way of a first API call from e-commerce platform 502 to camera platform 130.

In some embodiments, at step 516, based on receiving the notification, camera platform 130 activates a camera (e.g., camera 132) to capture a first image (e.g., pre-delivery image) of the designated drop-off area 136.

In some embodiments, at step 518, the delivery deriver 114 places the package (e.g., package 116) in the designated drop-off area 136. At step 520, the delivery driver 114 uploads a proof of delivery (e.g., by way of user device 120) to e-commerce platform 502. For example, the proof of delivery may be any suitable indicator of delivery, such as a photo of the delivered package or a scan of a code on the package.

In some embodiments, at step 522, when e-commerce platform 502 receives the proof of delivery, e-commerce platform 502 sends a second trigger (e.g., an unverified indication) to camera platform 130 notifying the camera platform 130 that the delivery has been made. For instance, the unverified indication may be sent by way of a second API call from e-commerce platform 502 to camera platform 130. In some embodiments, based on receiving the unverified indication, the camera platform 130 activates a camera 132 to capture a second image (e.g., post-delivery image) of the designated drop-off area 136.

In some embodiments, at step 524, e-commerce platform 502 sends a message to customer 508 (e.g., at a user device 160 associated with customer 508) that delivery has been made. For instance, the message may include a proof-of-delivery image and data related to the package (e.g., shipment tracking details, package contents). E-commerce platform 502 may send the message to the user device 160 while simultaneously sending the unverified indication to camera platform 130.

In some embodiments, at step 526, the camera platform 130 identifies the new package at the designated drop-off area by comparing the pre-delivery and post-delivery images. For instance, camera platform 130 may apply various object detection models and image analysis models to identify the package and confirm that the package is the correct package. Camera platform 130 may validate the unverified indication of delivery by determining that the correct package has indeed been delivered to the designated drop-off area. In some embodiments, at step 528, based on validating the unverified indication, the camera platform 130 may send a message to customer 508 (e.g., at user device 160) confirming that delivery has been made and that the package will be monitored.

In some embodiments, at step 530, camera platform 130 monitors the package for movement. For instance, camera platform 130 may activate camera 132 periodically to capture images of the designated drop-off area 136. For instance, camera platform 130 may continuously record a video of the designated drop-off area 136. Camera platform 130 may use any suitable deep learning (e.g., R-CNN, YOLO) or object detection model (e.g., background subtraction, frame differencing, temporal differencing, optical flow, occlusion detection, or shadow and illumination understanding) to detect movement of the package. Camera platform 130 may also use any one or a combination of these models to detect a user associated with the movement of the package. In some embodiments, camera platform 130 uses image recognition analysis to identify the user moving the package and compares the visual features of the user with a database of visual features of authorized and/or unauthorized users to determine whether the user is a user who is authorized to move the package.

In some embodiments, at step 532, if camera platform 130 detects movement of the package and/or determines that an unauthorized user is associated with the detected movement, then, at step 534, camera platform 130 sends an alert to the user device 160 of customer 508. For example, the alert may include a link to view in real time a live stream feed of the designated drop-off area. In some examples, the alert may include various user-selectable options, such as an option to perform an action addressing the movement of the package (e.g., activate a security system) or an option to cancel the alert. In some embodiments, at step 540, the camera platform 130 receives a selection of a user-selectable option and performs an action corresponding to the selection.

Figure 6A:
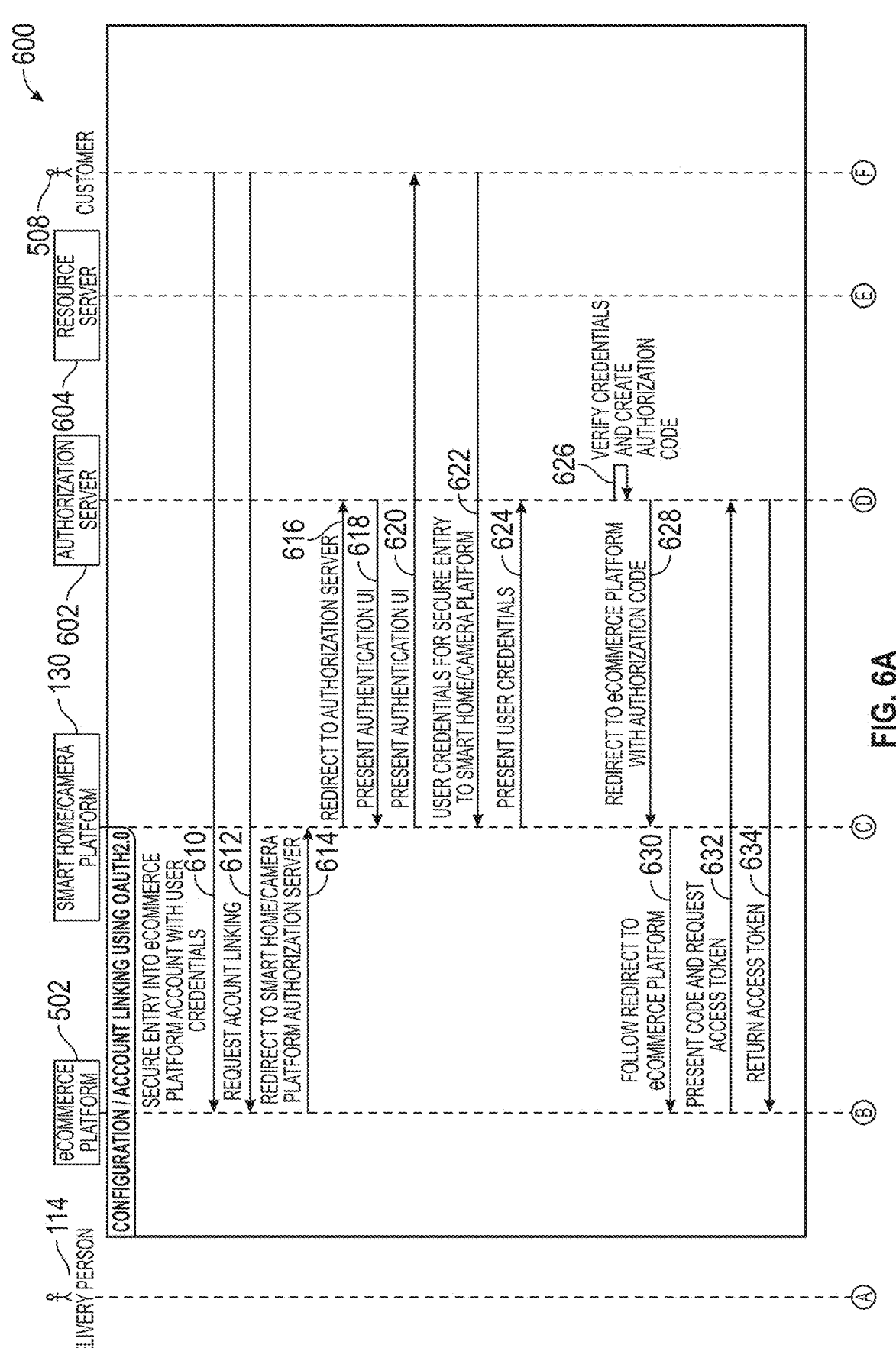
FIGS. 6A and 6B show a system sequence diagram of an illustrative process for securely linking multiple platforms and message transmission between the platforms for monitoring packages, in accordance with various embodiments of the disclosure.
Figure 6B:
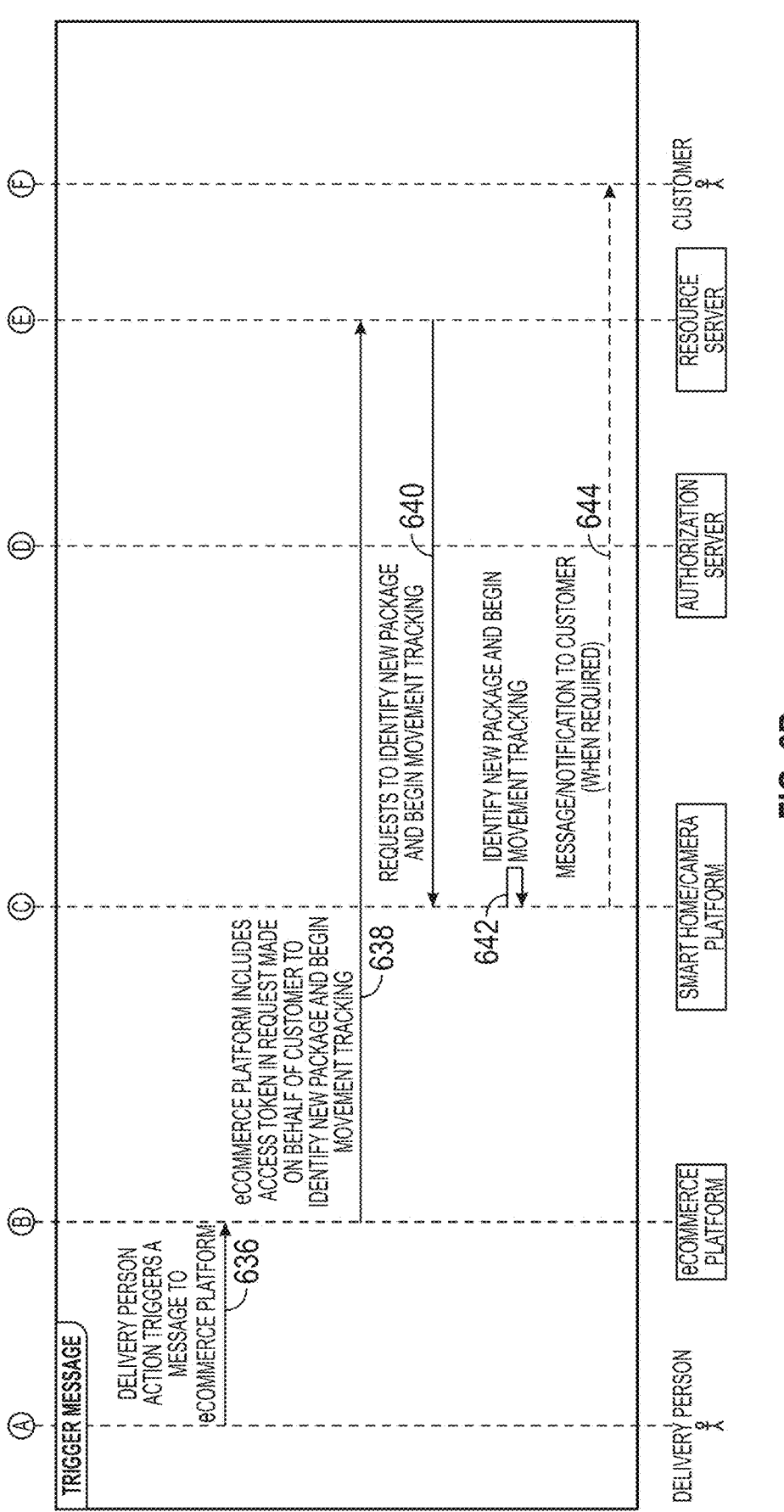

FIGS. 6A and 6B show a system sequence diagram of an illustrative process 600 for securely linking multiple platforms and transmitting messages between the platforms for monitoring packages, in accordance with various embodiments of the disclosure. Although the example as shown uses OAuth2.0 for account linking, it is understood that any other suitable authorization protocol may be implemented for connecting the e-commerce platform 502 (e.g., which may correspond with delivery platform 110 of FIG. 1) and camera platform 130. Although the example as shown uses e-commerce platform 502, it is understood that any delivery platform or other suitable platform for delivering packages may be used.

In some embodiments, at step 610, customer 508 (e.g., by way of user device 160 associated with the customer 508) initiates configuration of an authorization protocol for linking the customer's 508 accounts associated with e-commerce platform 502 and with camera platform 130 (also referred to as smart home/camera platform). For example, customer 608 may securely log in to e-commerce platform 502 with user credentials. At step 612, customer 508 may request account linking between their e-commerce platform 502 account and camera platform 130 account. For example, e-commerce platform 502 and/or camera platform 130 may provide (e.g., to user device 160 of customer 508) a user interface element for requesting account linking.

In some embodiments, based on receiving the customer 508 request, at steps 614 and 616, e-commerce platform 502 redirects the user device 160 to an authorization server 602 associated with the authorization protocol. The redirect Uniform Resource Identifier (URI) may be provided by camera platform 130. At step 618, authorization server 602 provides to camera platform 130 an authentication user interface (e.g., an authentication UI element) for entering credentials, which camera platform 130 presents to user device 106 of customer 508 at step 620.

In some embodiments, at step 622, customer 508 (e.g., by way of user device 160) enters customer credentials (e.g., customer's camera platform account credentials) via the authentication user interface for secure entry into camera platform 130. The camera platform 130 receives the credentials, and, at step 624, camera platform 130 presents the credentials to authorization server 602.

In some embodiments, at step 626, authorization server 602 ingests and verifies the customer's camera platform account credentials. Once the authorization server 602 verifies the credentials, it generates an authorization code. The authorization code is redirected to e-commerce platform 502 at steps 628 and 630.

In some embodiments, at step 632, e-commerce platform 502 presents the authorization code to authorization server 602 and requests an access token. At step 634, authorization server 602 validates the authorization code and based on the validation, returns the access token to e-commerce platform 502. The access token may be used by e-commerce platform 502 for sending authorized requests to protected resources of the camera platform 130 without requiring the e-commerce platform 502 and camera platform 130 to ever exchange customer credentials directly, thereby reducing security vulnerabilities. The access token may expire after a particular period of time. In some examples, the authorization server 602 sends a refresh token along with the access token to the e-commerce platform 502 to manage the expiry of the access token. For instance, the refresh token allows e-commerce platform 502 to request a new access token from authorization server 602 upon expiry of the previous access token.

In some embodiments, at step 636, an action by delivery driver 114 relating to the delivery of the package triggers a message to e-commerce platform 502. For instance, the delivery driver 114 may upload a proof-of-delivery image or scan a code associated with the package upon delivery. For instance, the message may notify e-commerce platform 502 that the package has been delivered at the delivery address of customer 508.

In some embodiments, at step 638, e-commerce platform 502 sends a request to resource server 604 associated with camera platform 130 to access resources of camera platform 130 (e.g., activate cameras) for identifying and monitoring the delivered package. For example, the request may include the access token which permits e-commerce platform 502 to make requests (e.g., by way of an inter-platform API call) to resource server 604.

In some embodiments, at step 640, based on receiving the request and access token from e-commerce platform 502, the resource server 604 authorizes the appropriate camera resources of camera platform 130 to perform actions needed to identify the package and track package movement at step 642.

In some embodiments, at step 644, if camera platform 130 detects package movement and/or determines that the package movement is associated with an unauthorized user, camera platform 130 sends a message to user device 160 notifying the customer 508 of such movement, providing video of the movement, and/or providing a user-selectable option to perform an action addressing the movement.

Figure 7:
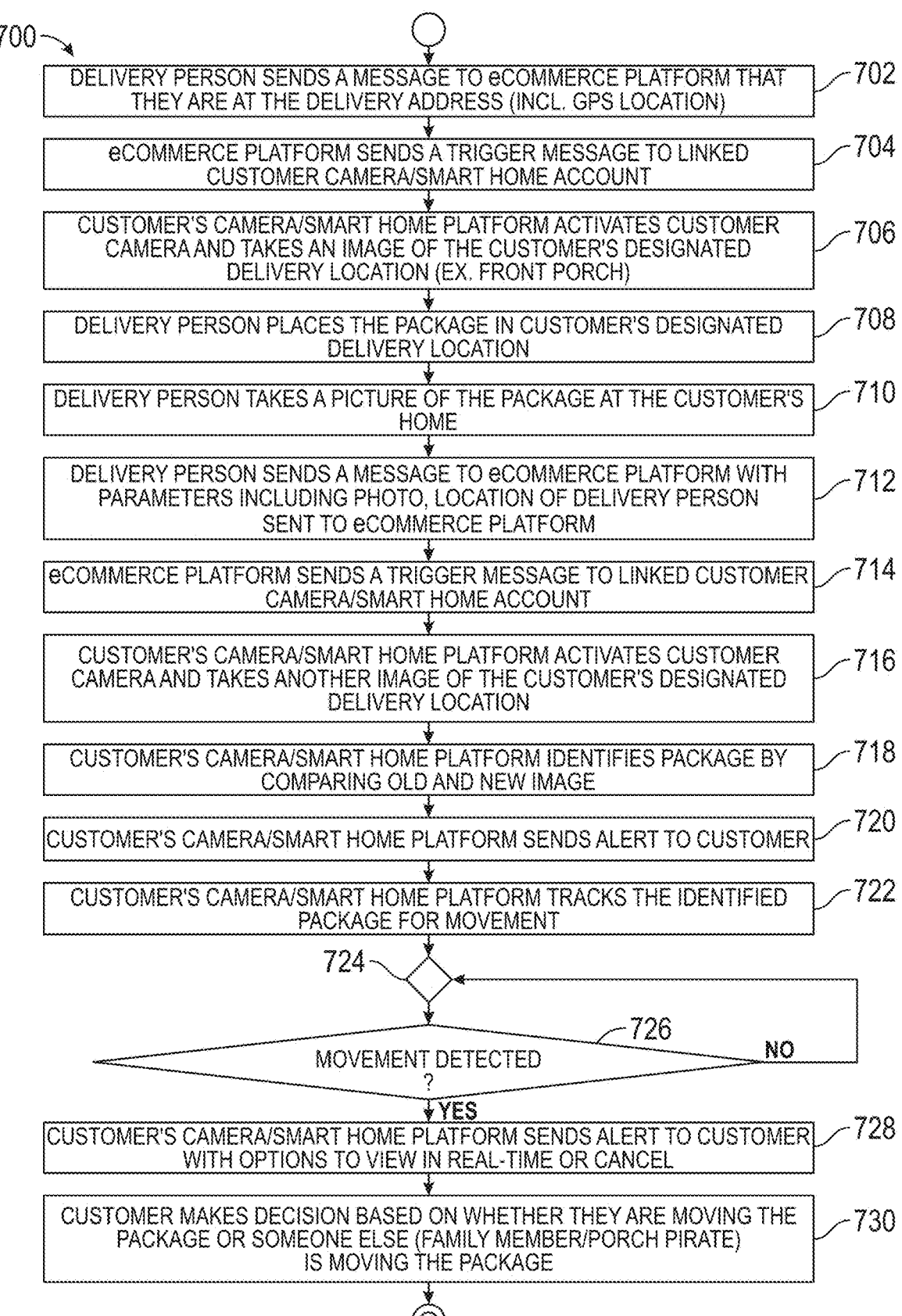
FIG. 7 shows an example process for monitoring packages, in accordance with various embodiments of the disclosure.

FIG. 7 shows an example process 700 for monitoring packages, in accordance with various embodiments of the disclosure. In some embodiments, at step 702, control circuitry 431 receives a message from delivery driver 114 (e.g., via user device 120) that the delivery driver 114 is located at the delivery address 134. For example, the message may include the current location data (e.g., GPS coordinates) of user device 120. Control circuitry 431 may determine that the current location data of user device 120 matches the location data of the delivery address 134.

In some embodiments, at step 704, control circuitry 431 sends a first trigger message to the camera platform 130. The customer delivery platform account and customer camera platform account may be securely linked (e.g., by way of an authorization protocol). For example, the first trigger message may confirm that the delivery driver 114 has arrived at the delivery address 134 location and that delivery of the package is imminent (e.g., that the package will be dropped off in the designated drop-off area of the delivery address within a certain time frame, such as 10 seconds). At step 706, based on receiving the first trigger message, control circuitry 411 activates at least one camera associated with the camera platform 130 to take a first image (e.g., a pre-delivery image) of the designated drop-off area associated with the delivery address.

In some embodiments, at step 708, delivery driver 114 places the package at the designated drop-off area and takes a proof-of-delivery image (e.g., via their user device 120) of the delivered package at step 710. At step 712, control circuitry 431 receives a message from user device 120 of delivery driver 114 that the package has been delivered. The message may include various parameters relating to the delivery, such as the proof-of-delivery image, the location data of the user device 120 at the time of delivery or at the time of sending the message, a timestamp of the proof-of-delivery image, any other suitable parameter relating to the delivery, or a combination thereof.

In some embodiments, at step 714, based on receiving the message from delivery driver 114 that the package has been delivered, control circuitry 431 sends a second trigger message to the camera platform 130. For instance, the second trigger message may include an unverified indication that the package has been delivered to the delivery address.

Based on receiving the second trigger message, control circuitry 411 activates at least one camera associated with the camera platform 130 to take a second image (e.g., a post-delivery image) of the designated drop-off area at step 716.

In some embodiments, at step 718, the control circuitry 411 identifies the delivered package and confirms that the package was delivered based on comparing the first and second images (e.g., the pre- and post-delivery images). For example, control circuitry 411 may use various object detection models or other image analysis models to detect and identify the delivered package from the images. Control circuitry 411 may also use data received from the delivery platform relating to the package (e.g., package dimensions or other suitable characteristics) to identify the delivered package from the images (e.g., by comparing the dimensions of the physical package detected based on object detection models with the dimensions listed in the package data from the delivery platform). Based on identifying the package and confirming that it has been delivered, at step 720, control circuitry 411 may send an alert to the customer (e.g., by way of user device 160 associated with the customer) confirming delivery.

In some embodiments, control circuitry 411 identifies the package based on obtaining data from a machine-readable code or label affixed to the package. For example, control circuitry 411 may activate a camera of the camera platform to scan the code when the package is delivered. In some examples, control circuitry 411 may, at the expected time of delivery, begin monitoring the designated drop-off area (e.g., via a live feed from the camera platform). If control circuitry 411 determines (e.g., via object detection models) that a delivery driver 114 is present in the designated drop-off area and dropping off the package but that the code is not visible (within a field of view of the camera), control circuitry 411 may, in real time, send instructions to the delivery driver 114 (e.g., by way of user device 120) to position the package such that the code is visible to the camera.

In some embodiments, at step 722, based on confirming package delivery, control circuitry 411 tracks the delivered package for movement. For example, at step 724, control circuitry 411 may apply various moving object detection techniques, deep learning models, or any suitable image analysis model, to detect movement in relation to the package. At step 726, if movement in relation to the package is detected, control circuitry 411 may also determine if such movement is associated with a user. Control circuitry 411 may also determine, based on searching a database of characteristics of authorized and unauthorized users, whether such user is authorized to move the package.

In some embodiments, at step 728, if control circuitry 411 detects movement in relation to the package and/or that such movement is associated with an unauthorized user, control circuitry 411 sends an alert to the customer (e.g., by way of customer's user device 160). The alert may include options to perform an action addressing the movement, a link to view a real-time video or receive a recorded video of the package movement, and/or an option to cancel the alert.

In some embodiments, at step 730, control circuitry 411 receives from user device 160 of the customer a selection of at least one of the options in the alert. Based on receiving the selection received, control circuitry 411 may perform an action corresponding to the selection.

Figure 8:
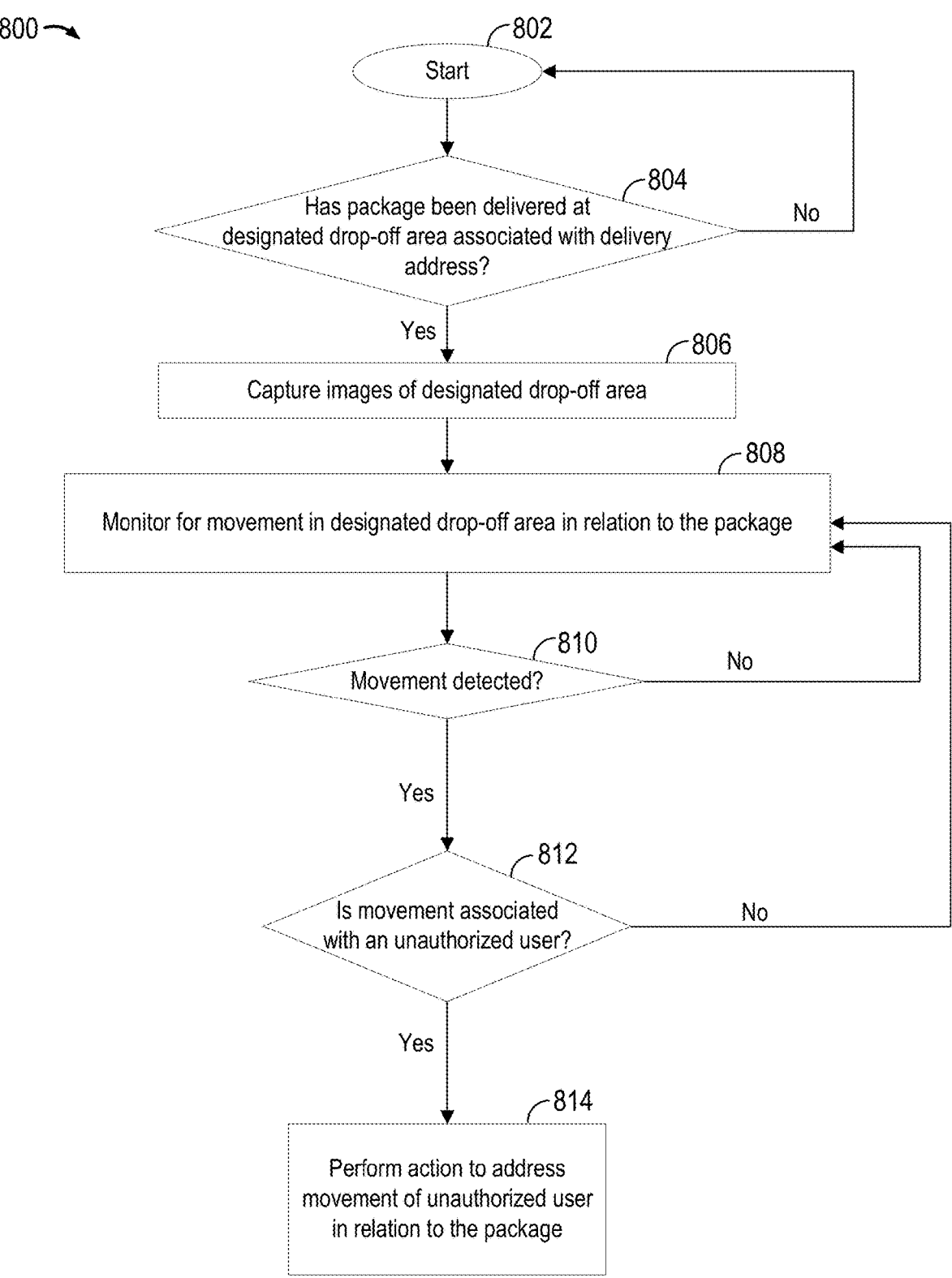
FIG. 8 is a flowchart of another example process for monitoring packages, in accordance with various embodiments of the disclosure.

FIG. 8 is a flowchart of another example process 800 for monitoring packages, in accordance with various embodiments of the disclosure. In some embodiments, at step 804, control circuitry 431 determines whether a package that is expected to be delivered at a delivery address has been delivered (e.g., at a designated drop-off area associated with the delivery address). If so, then at step 806, control circuitry 411 activates a camera associated with the delivery address to capture images of the designated drop-off area. In some embodiments, the images are included in a video of the designated drop-off area.

In some embodiments, at step 808, control circuitry 411 monitors the designated drop-off area for movement in relation to the delivered package. Control circuitry 411 may use various moving object detection models, deep learning models, or any suitable image analysis techniques, to detect movement in relation to the package. At step 810, if movement in relation to the package is detected, then at step 812, control circuitry 411 determines whether the detected movement is associated with an unauthorized user. For example, control circuitry 411 may apply facial recognition models to determine facial features of the user moving the package and search a database of facial features of authorized users for a match. If control circuitry 411 determines that the user moving the package is not an authorized user, then at step 814, control circuitry 411 performs an action to address the unauthorized movement. For example, an action may include initiating an alarm system, a neighborhood watch system, or other security system; contacting security services or a delivery platform associated with delivering the package; any other suitable action for monitoring, replacing, or securing the moved package; or a combination thereof. Additionally, or alternatively, the action may include providing the captured images (or video) of the user moving the package. In some examples, control circuitry 411 may send an alert to a user device of the customer associated with the package, wherein the alert includes an option to select any of the aforementioned actions or to request that no actions be performed.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method, comprising:
   determining, at a first platform associated with a camera located at a delivery address, that a package has been delivered to a designated drop-off area associated with the delivery address, wherein the determining that the package has been delivered to the designated drop-off area further comprises:
      receiving an unverified indication that the package has been delivered to the delivery address; and
      based on receiving the unverified indication, verifying that the package is located at the designated drop-off area based on a plurality of first images captured by the camera, wherein the plurality of first images captured by the camera comprises images captured prior to determining that the package has been delivered to the designated drop-off area, and wherein the plurality of first images captured by the camera are included in a video;
   based on receiving the unverified indication that the package has been delivered, generating a tag;
   associating the tag with a timepoint in the video, wherein the timepoint corresponds to a time when the unverified indication was received;
   providing, to a user device, the video and the tag, wherein the tag allows for navigating the video directly to the timepoint in the video;
   monitoring, by the first platform based on a plurality of second images captured by the camera, for movement in the designated drop-off area in relation to the package; and
   based on detecting movement in the designated drop-off area in relation to the package, performing an action to address the movement.

2. The computer-implemented method of claim 1, wherein the unverified indication is received based on a proof-of-delivery image of the delivered package being uploaded to a second platform associated with the delivery of the package.

3. The computer-implemented method of claim 1, wherein the unverified indication is received based on a person scanning a code on the package, wherein the person is associated with a second platform associated with the delivery of the package.

4. The computer-implemented method of claim 1, wherein the unverified indication is received based on:
   capturing, by the camera, a first image of the designated drop-off area at a first time prior to the package being delivered;
   detecting that a device associated with delivery of the package is within a proximity of the delivery address; and
   capturing a second image of the designated drop-off area at a second time later than the first time.

5. The computer-implemented method of claim 1, wherein the determining that the package has been delivered to the designated drop-off area further comprises:
   capturing, by the camera, a first image of the designated drop-off area at a first time prior to the package being delivered;
   capturing a second image of the designated drop-off area at a second time later than the first time;
   based on comparing the first image and the second image, determining that an object has been delivered at the designated drop-off area; and
   identifying the object as the package.

6. The computer-implemented method of claim 1, wherein the first platform and a second platform associated with the delivery of the package are communicatively connected by way of an authorization protocol.

7. The computer-implemented method of claim 1, wherein the action comprises providing a notification of the movement, wherein the notification includes a user-selectable option to view the images captured by the camera.

8. The computer-implemented method of claim 1, further comprising:
   determining whether the movement is associated with an authorized user or an unauthorized user;
   wherein the action to address the movement is performed based on determining that the movement is associated with an unauthorized user.

9. The computer-implemented method of claim 8, wherein the determining whether the movement is associated with an authorized user or an unauthorized user further comprises:

based on the detecting the movement in the designated drop-off area in relation to the package, capturing an image of the designated drop-off area;

detecting a user in the captured image; and identifying the user by searching a database of images of authorized users for a match with the user in the captured image.

10. The computer-implemented method of claim 1, wherein the unverified indication is received by way of application programming interface (API) call received by the first platform from a second platform associated with the delivery of the package.

11. The computer-implemented method of claim 1, wherein a visual indication of the tag is presented on the user device while the video is played on the user device.

12. A computer-implemented method of claim 5, further comprising:

determining, at a first platform associated with a camera located at a delivery address, that a package has been delivered to a designated drop-off area associated with the delivery address, wherein the determining that the package has been delivered to the designated drop-off area further comprises:

capturing, by the camera, a first image of the designated drop-off area at a first time prior to the package being delivered;

determining that the package within a field of view of the camera is at least partially obstructed by a person delivering the package;

capturing a second image of the designated drop-off area at a second time later than the first time, wherein the capture of the second image is delayed until the package within the field of view of the camera is no longer obstructed by the person delivering the package;

based on comparing the first image and the second image, determining that an object has been delivered at the designated drop-off area; and identifying the object as the package;

monitoring, by the first platform based on images captured by the camera, for movement in the designated drop-off area in relation to the package; and based on detecting movement in the designated drop-off area in relation to the package, performing an action to address the movement.

13. A system, comprising:

control circuitry configured to:

determine, at a first platform associated with a camera located at a delivery address, that a package has been delivered to a designated drop-off area associated with the delivery address, wherein the control circuitry, in determining that the package has been delivered to the designated drop-off area, is further configured to:

receive an unverified indication that the package has been delivered to the delivery address; and based on receiving the unverified indication, verify that the package is located at the designated drop-off area based on a plurality of first images captured by the camera, wherein the plurality of first images captured by the camera comprises images captured prior to determining that the package has been delivered to the designated drop-off area, and wherein the plurality of first images captured by the camera are included in a video;

based on receiving the unverified indication that the package has been delivered, generate a tag;

associate the tag with a timepoint in the video, wherein the timepoint corresponds to a time when the unverified indication was received; and provide, to a user device, the video and the tag, wherein the tag allows for navigating the video directly to the timepoint in the video;

input/output circuitry configured to:

receive a plurality of second images captured by the camera; and wherein the control circuitry is further configured to:

monitor, by the first platform based on the plurality of second images captured by the camera, for movement in the designated drop-off area in relation to the package; and based on detecting movement in the designated drop-off area in relation to the package, perform an action to address the movement.

14. The system of claim 13, wherein the unverified indication is received based on a proof-of-delivery image of the delivered package being uploaded to a second platform associated with the delivery of the package.

15. The system of claim 13, wherein the unverified indication is received based on a person scanning a code on the package, wherein the person is associated with a second platform associated with the delivery of the package.

16. The system of claim 13, wherein the unverified indication is received based on:

capturing, by the camera, a first image of the designated drop-off area at a first time prior to the package being delivered;

detecting that a device associated with delivery of the package is within a proximity of the delivery address; and capturing a second image of the designated drop-off area at a second time later than the first time.

17. The system of claim 13, wherein the control circuitry configured to determine that the package has been delivered to the designated drop-off area is further configured to:

capture, by the camera, a first image of the designated drop-off area at a first time prior to the package being delivered;

capture a second image of the designated drop-off area at a second time later than the first time;

based on comparing the first image and the second image, determine that an object has been delivered at the designated drop-off area; and identify the object as the package.

18. The system of claim 17, wherein the control circuitry is further configured to:

determine that the package within a field of view of the camera is at least partially obstructed by a person delivering the package; and delay capture of the second image until the package within the field of view of the camera is no longer obstructed by the person delivering the package.

19. The system of claim 13, wherein the control circuitry is further configured to:

determine whether the movement is associated with an authorized user or an unauthorized user; and perform the action to address the movement based on determining that the movement is associated with an unauthorized user.

20. The system of claim 19, wherein the control circuitry configured to determine whether the movement is associated with an authorized user or an unauthorized user is further configured to:

based on the detecting the movement in the designated drop-off area in relation to the package, capture an image of the designated drop-off area;

detect a user in the captured image; and identify the user by searching a database of images of authorized users for a match with the user in the captured image.

* * * * *